United States Patent
Shimizu et al.

(10) Patent No.: US 10,444,563 B2
(45) Date of Patent: Oct. 15, 2019

(54) REFLECTIVE POLARIZING FILM FOR LIQUID CRYSTAL DISPLAY POLARIZER, POLARIZER FOR LIQUID CRYSTAL DISPLAY COMPRISING SAME, OPTICAL MEMBER FOR LIQUID CRYSTAL DISPLAY, AND LIQUID CRYSTAL DISPLAY

(71) Applicant: TEIJIN LIMITED, Osaka-shi, Osaka (JP)

(72) Inventors: Tomoko Shimizu, Tokyo (JP); Taro Oya, Tokyo (JP); Takashi Nakahiro, Tokyo (JP); Koji Kubo, Tokyo (JP)

(73) Assignee: TEIJIN LIMITED, Osaka (JP)

( * ) Notice: Subject to any disclaimer, the term of this patent is extended or adjusted under 35 U.S.C. 154(b) by 211 days.

(21) Appl. No.: 15/124,505

(22) PCT Filed: Mar. 11, 2015

(86) PCT No.: PCT/JP2015/057104
§ 371 (c)(1),
(2) Date: Sep. 8, 2016

(87) PCT Pub. No.: WO2015/141533
PCT Pub. Date: Sep. 24, 2015

(65) Prior Publication Data
US 2017/0017117 A1  Jan. 19, 2017

(30) Foreign Application Priority Data
Mar. 19, 2014 (JP) .................. 2014-056550

(51) Int. Cl.
*G02F 1/1335* (2006.01)
*G02B 5/30* (2006.01)

(52) U.S. Cl.
CPC ....... *G02F 1/133536* (2013.01); *G02B 5/305* (2013.01); *G02B 5/3033* (2013.01);
(Continued)

(58) Field of Classification Search
CPC .... G02B 5/3025; G02B 5/3041; G02B 5/305; G02B 5/3033; G02B 5/3083;
(Continued)

(56) References Cited

U.S. PATENT DOCUMENTS 5,486,949 A   1/1996  Schrenk et al.
6,368,699 B1  4/2002  Gilbert et al.
(Continued)

FOREIGN PATENT DOCUMENTS

CN   102652063 A    8/2012
EP   2 722 695 A1   4/2014
(Continued)

OTHER PUBLICATIONS

Communication dated Mar. 9, 2017 from the European Patent Office in counterpart Application No. 15765632.3.
(Continued)

*Primary Examiner* — Ruiyun Zhang
(74) *Attorney, Agent, or Firm* — Sughrue Mion, PLLC

(57) ABSTRACT

A reflective polarizing film for a liquid crystal display polarizer that has a high polarization performance and eliminates a hue shift at an oblique azimuth of 45°, a polarizer for a liquid crystal display composed of the same, an optical member for a liquid crystal display, and a liquid crystal display are provided. In a reflective polarizing film for a liquid crystal display polarizer composed of a uniaxially stretched multi-layer laminate film in which a first layer and a second layer are alternately laminated, the reflective polarizing film has a polarization degree of 99.5% or more and an amplitude of a transmittance waveform of 2.0% or less in a wavelength range of 450 to 650 nm measured with respect to the polarized light incident at an incident angle of
(Continued)

60° on an incident plane including an azimuth angle of 45°, among polarized light components parallel to the transmission axis.

19 Claims, 3 Drawing Sheets

(52) U.S. Cl.
CPC .......... *Y10T 428/10* (2015.01); *Y10T 428/105* (2015.01); *Y10T 428/1036* (2015.01)

(58) Field of Classification Search
CPC ................ C08G 63/187; C08G 63/672; G02F 2001/133545; G02F 1/133536; Y10T 428/10; Y10T 428/1041; Y10T 428/1036; Y10T 428/1086; Y10T 428/31786
USPC .... 428/1.1, 1.3, 1.31, 1.33, 1.5, 1.54, 847.3, 428/847.4; 349/96; 359/485.01, 485.03, 359/488.01, 489.11, 489.12; 528/176, 528/209
See application file for complete search history.

(56) References Cited

U.S. PATENT DOCUMENTS

| | | | |
|---|---|---|---|
| 6,673,425 B1 | 1/2004 | Hebrink et al. | |
| 6,677,031 B1 | 1/2004 | Murooka et al. | |
| 6,891,584 B1 | 5/2005 | Kashima | |
| 2009/0128737 A1* | 5/2009 | Ouderkirk | G02B 5/305 349/64 |
| 2012/0249935 A1* | 10/2012 | Oya | B32B 27/08 349/96 |
| 2014/0132897 A1* | 5/2014 | Oya | G02B 5/305 349/96 |
| 2014/0287211 A1 | 9/2014 | Oya et al. | |
| 2015/0124194 A1* | 5/2015 | Oya | G02B 5/3083 349/61 |

FOREIGN PATENT DOCUMENTS

| | | | |
|---|---|---|---|
| JP | 4268505 A | 9/1992 | |
| JP | 9506837 A | 7/1997 | |
| JP | 9507308 A | 7/1997 | |
| JP | 2005316511 A | 11/2005 | |
| JP | 2009103817 A | 5/2009 | |
| JP | 201213919 A | 1/2012 | |
| JP | 2013-3408 A | 1/2013 | |
| JP | 2013-7788 A | 1/2013 | |
| TW | 201305620 A1 | 2/2013 | |
| WO | 9517303 A1 | 6/1995 | |
| WO | 9517691 A1 | 6/1995 | |
| WO | 0147711 A1 | 7/2001 | |
| WO | 2013/057845 A1 | 4/2013 | |
| WO | WO-2014046225 A1 * | 3/2014 | ........... G02B 5/3083 |

OTHER PUBLICATIONS

Communication dated Aug. 29, 2017 issued by the Japanese Patent Office in counterpart application No. 2016-508676.
International Search Report for PCT/JP2015/057104 dated May 19, 2015 [PCT/ISA/210].
Communication dated Sep. 14, 2018, from State Intellectual Property Office of the P.R.C. in counterpart application No. 201580014700.9.

* cited by examiner

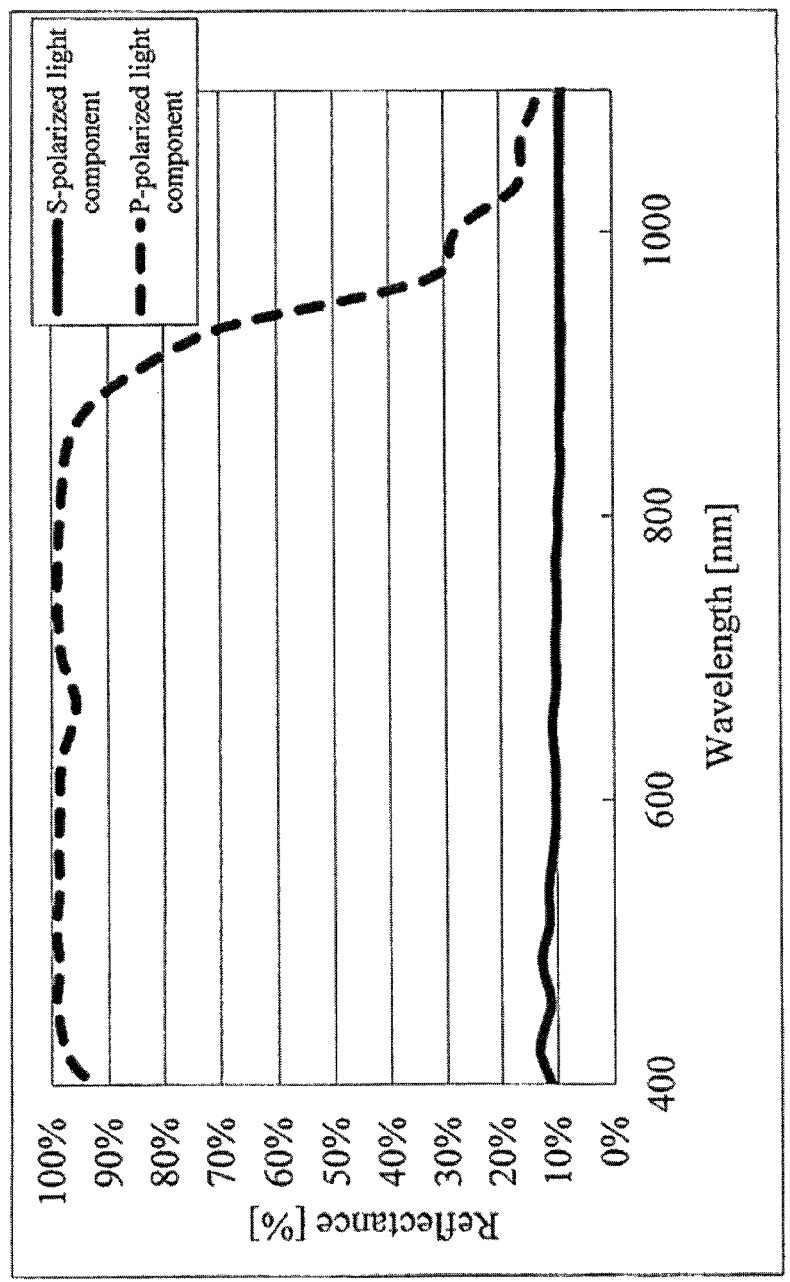
[Fig. 1]

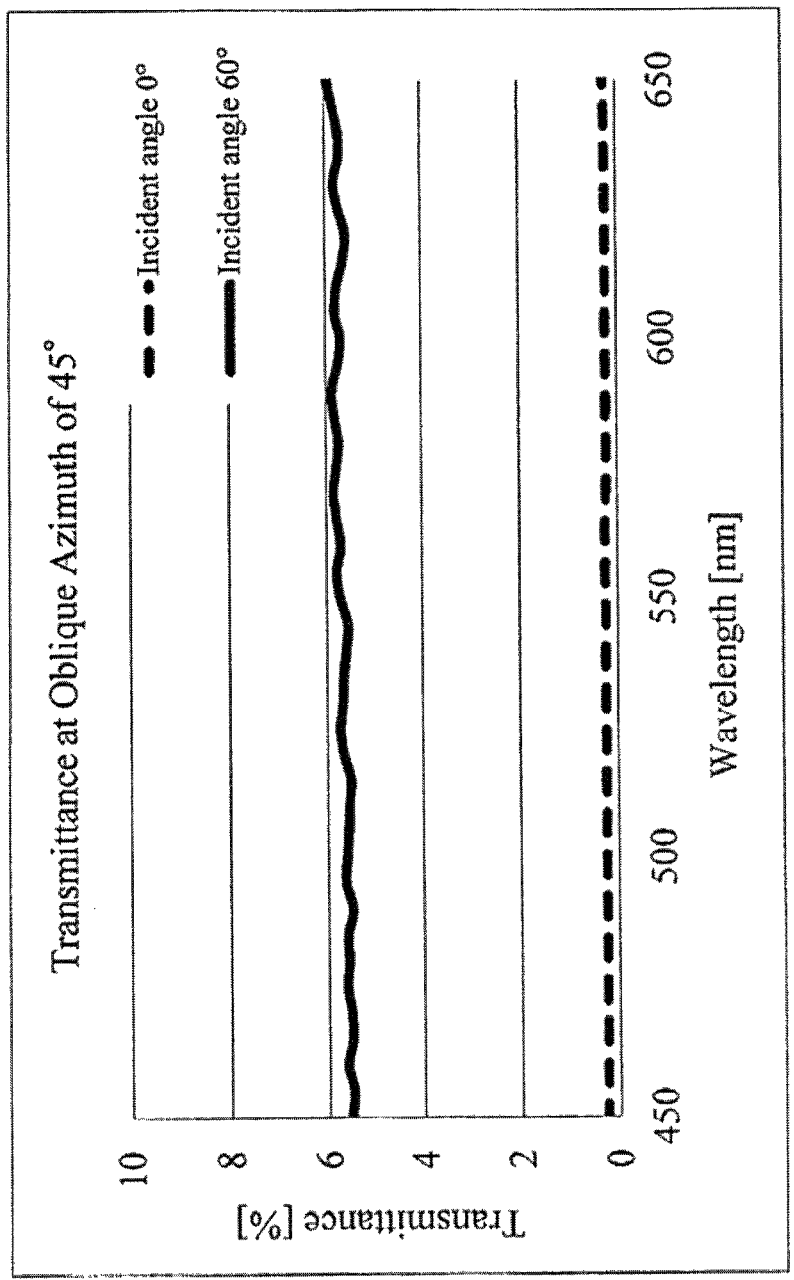
[Fig. 2]

[Fig. 3]
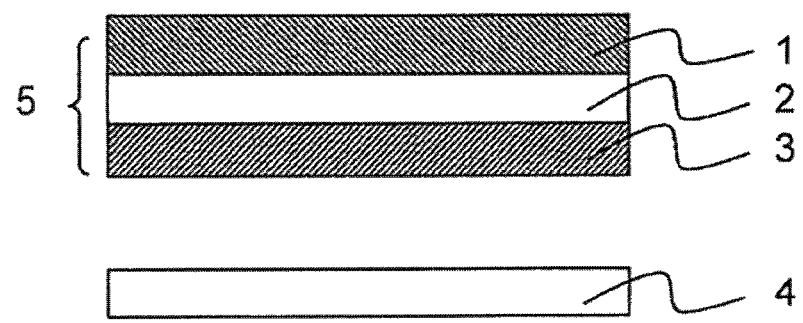

REFLECTIVE POLARIZING FILM FOR LIQUID CRYSTAL DISPLAY POLARIZER, POLARIZER FOR LIQUID CRYSTAL DISPLAY COMPRISING SAME, OPTICAL MEMBER FOR LIQUID CRYSTAL DISPLAY, AND LIQUID CRYSTAL DISPLAY

CROSS REFERENCE TO RELATED APPLICATIONS

This application is a National Stage of International Application No. PCT/JP2015/057104, filed on Mar. 11, 2015 (which claims priority from Japanese Patent Application No. 2014-056550, filed on Mar. 19, 2014), the contents of which are incorporated herein by reference in their entirety.

TECHNICAL FIELD

The present invention relates to a reflective polarizing film for a liquid crystal display polarizer, a polarizer for a liquid crystal display composed of the same, an optical member for a liquid crystal display, and a liquid crystal display. More specifically, the present invention relates to a reflective polarizing film for a liquid crystal display polarizer composed of a uniaxially stretched multi-layer laminate film and having a high polarization degree comparable to that of an absorption type polarizer, a luminance enhancing effect and viewing angle characteristics, a polarizer for a liquid crystal display composed of the same, an optical member for a liquid crystal display, and a liquid crystal display.

BACKGROUND ART

A liquid crystal display device (LCD) makes it possible to serve as a display through regulating transmission of light irradiated from a light source by using a liquid crystal panel composed of a liquid crystal cell and polarizers disposed on both sides thereof. As the polarizers attached to the liquid crystal cell, an absorption type polarizer which is called a light-absorption type dichroic linear polarizer is generally used. A polarizer in which iodine-containing PVA is protected with triacetyl cellulose (TAC) is widely used.

The absorption type polarizer transmits light that is polarized in a direction of transmission axis and absorbs almost all of light that is polarized in a direction perpendicular to the transmission axis. It is pointed out that about 50% of light irradiated from a light source device is absorbed by the absorption type polarizer, and that light utilization efficiency is lowered. Therefore, in order to use efficiently the polarized light in the direction perpendicular to the transmission axis, a configuration, wherein a reflective polarizer called a luminance enhancement film is used between the light source and the liquid crystal panel, has been investigated. As an example of the reflective polarizer, a polymer film that employs optical interference has been investigated (PTL 1 and others).

On the other hand, regarding the polarizer attached to the liquid crystal cell, various kinds of lamination configurations including a reflection display that uses outside light and a transmission display that uses backlight, in which the absorption type polarizer and reflection type polarizer are used in combination, have also been investigated in accordance with kinds and purposes of light used in the display device.

For example, PTL 2 discloses a liquid crystal display device in which an electric field is applied to a liquid crystal layer to vary the retardation value of the liquid crystal and shift a certain amount of the phase difference of the incident polarized light on the liquid crystal layer. Here, as an example of the polarizers used on the both sides of the liquid crystal layer, a reflective polarizer of a planar multilayer structure including three or more layers of films having birefringence, provided on the light source side, and an absorption type polarizer provided on the side opposite to the light source side, interposed by the liquid crystal layer are disclosed.

PTL 3 describes, when an absorption type polarizer and a reflective polarizer provided on the both sides of a liquid crystal cell that includes a liquid crystal between flexible substrates are used, warping is brought about the difference in the amount of expansion and contraction of each polarizer caused by temperature change, and it is proposed to eliminate the warping by combining these polarizers to form a specific laminate configuration. PTL 3 also describes use of a birefringent dielectric multilayer film as an example of the reflective polarizer, and specifically discloses a luminance enhancement film.

However, reflective polarizing polymer films employing a birefringent multi-layer structure, which have been investigated so far (for example, PTLs 4 to 6) have a function of reflecting P-polarized light and transmitting S-polarized light, but their polarization degree has not attained a level equivalent to that of a dichroic linear polarizer.

For example, in the case of a multi-layer laminate film described in PTL 5 and others, in which polyethylene-2,6-naphthalene dicarboxylate (hereinafter, called as 2,6-PEN in some cases) is used for a high refractive index layer and PEN copolymerized with a thermoplastic elastomer or terephthalic acid in an amount of 30 mol % is used as a low refractive index layer, a certain level of polarization performance is achieved by way of: increasing the difference in interlayer refractive indexes in a stretching direction (X direction) through stretching so as to enhance reflectance of P polarization; and, on the other hand, by way of decreasing the difference in interlayer refractive indexes in a direction (Y direction) perpendicular to the in-plane X direction of the film so as to enhance transmission of S-polarized light.

However, when the polarization performance is tried to be enhanced to the level of the dichroic linear polarizer, difference arises, due to the nature of 2,6-PEN polymer, among the refractive indexes in Y direction and among the refractive indexes in the direction of film thickness (Z direction) as stretch develops in X direction; when the interlayer refractive indexes in Y direction are brought into agreement, the difference in the interlayer refractive indexes in Z direction becomes large; accordingly, partial reflection of light that enters in an oblique direction makes hue shift of transmitted light larger.

Therefore, when an attempt is made to put into practical use a liquid crystal display device that is provided with only a polymer film having the above multi-layer structure as one of the polarizers of a liquid crystal cell without an absorption type polarizer combined, achieving both a high polarization degree and elimination of a hue shift in an oblique direction has become an issue.

To solve the problem, the present inventors have, in PTL 7, contemplated the adoption of a reflective polarizer composed of a polymer film having a multi-layer structure, capable of being used as a polarizer disposed adjacent to a liquid crystal cell and of replacing an absorption type polarizer. Accordingly, the present inventors have proposed, by using a certain specific polymer as a high refractive index layer and by uniaxially aligning the polymer, to enhance the polarization performance higher than a having a conventional reflective polarizer having a multi-layer structure and also to improve the hue shift of the transmitted light.

However, although the reflective polarizing film suggested in PTL 7 has achieved a high polarization degree of about 97 to 98%, the film is required to have a well-suppressed hue shift at an oblique angle in an azimuth of 45° between X direction and Y direction (hereinafter, referred to as an oblique azimuth of 45° in some cases), in addition to a further higher polarization performance, in order to be used as a polarizer for a liquid crystal display for a high performance television or personal computer.

[PTL 1]
Japanese Patent Unexamined Patent Application Publication (Translation of PCT application) No. H09-507308
[PTL 2]
Japanese Patent Application Laid-Open Publication No. 2005-316511
[PTL 3]
Japanese Patent Application Laid-Open Publication No. 2009-103817
[PTL 4]
Japanese Patent Application Laid-Open Publication No. H04-268505
[PTL 5]
Japanese Patent Unexamined Patent Application Publication (Translation of PCT application) No. H9-506837
[PTL 6]
International Publication No. WO 01/47711
[PTL 7]
Japanese Patent Application Laid-Open Publication No. 2012-13919

SUMMARY OF INVENTION

Technical Problem

An object of the present invention is to provide a reflective polarizing film for a liquid crystal display polarizer that, while being a reflective polarizer composed of a polymer film having a multi-layer structure, has a high polarization performance and additionally eliminates a hue shift in an oblique azimuth of 45°, a polarizer for a liquid crystal display composed of the same, an optical member for a liquid crystal display, and a liquid crystal display.

Solution to Problem

The inventors have made extensive investigations to solve the aforementioned problems and, as a result, in addition to conventional findings, found that, in a polarized light component parallel to the transmission axis of the film, a hue shift at the oblique azimuth of 45°, assigning the uniaxially stretching direction (X direction) of a film to an azimuth angle of 0°, is eliminated by regulating the amplitude of the transmittance waveform at an oblique azimuth of 45° smaller, and have completed the present invention.

Namely, the object of the present invention is achieved by a reflective polarizing film for a liquid crystal display polarizer (Item 1) that is a reflective polarizing film for a liquid crystal display polarizer composed of a uniaxially stretched multi-layer laminate film in which a first layer and a second layer are alternately laminated, wherein the reflective polarizing film has a polarization degree (P) represented by the following equation (1) of 99.5% or more:

Polarization degree $(P)=\{(Ts-Tp)/(Tp+Ts)\} \times 100$  (1)

(wherein, in the equation (1), Tp represents an average transmission for P-polarized light in a wavelength range of 400 nm to 800 nm and Ts represents an average transmission for S-polarized light in a wavelength range of 400 nm to 800 nm), and wherein the amplitude of a transmittance waveform in a wavelength range of 450 to 650 nm is 2.0% or less, the amplitude being measured among polarized light components parallel to the transmission axis with respect to the incident polarized light at an incident angle of 60° on an incident plane including an azimuth angle of 45°, when a uniaxially stretched direction (X direction) is assigned to the extinction axis of the reflective polarizing film and a film in-plane direction (Y direction) perpendicular to the uniaxially stretched direction is assigned to the transmission axis of the reflective polarizing film, and X direction is set at an azimuth angle of 0° and Y direction is set at an azimuth angle of 90°.

The reflective polarizing film for a liquid crystal display polarizer of the present invention also includes, as a preferable embodiment, at least any one of the following items 2 to 10.

(Item 2) The reflective polarizing film for a liquid crystal display polarizer as described in item 1, wherein the first layer is a layer containing a polyester, the first layer 1) containing a naphthalene dicarboxylic acid component as a dicarboxylic acid component that composes the polyester, in an amount of 50 mol or more and 70 mol or less, 2) containing a diol component having an alkylene group having 2 to 10 carbon atoms as a diol component, in an amount of 90 mol % or more and 100 mol % or less, and 3) having no diffraction peak of a (-110) crystal plane derived from the crystalline structure of an alkylene naphthalate in wide-angle X-ray diffraction measurement.

(Item 3) The reflective polarizing film for a liquid crystal display polarizer described in item 1 or 2, wherein the first layer contains a component represented by the following formula (A) as a dicarboxylic acid component, in an amount of 25 mol % or more and 50 mol % or less.

[Chem. 1]

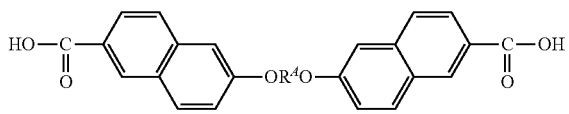

(A)

(wherein, in the formula (A), $R^A$ represents an alkylene group having 2 to 10 carbon atoms.)

(Item 4) The reflective polarizing film for a liquid crystal display polarizer described in item 1 or 2, wherein the first layer contains a component represented by the following formula (B) as a dicarboxylic acid component, in an amount of 25 mol % or more and 50 mol % or less.

[Chem. 2]

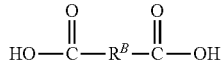

(B)

(wherein, in the formula (B), $R^B$ represents a biphenyl group.)

(Item 5) The reflective polarizing film for a liquid crystal display polarizer described in any of items 1 to 4, wherein the polymer that forms the second layer is a copolymer polyethylene terephthalate containing at least one kind selected from the group consisting of isophthalic acid, 2,6-naphthalene dicarboxylic acid, and an alicyclic diol as the copolymer component.
(Item 6) The reflective polarizing film for a liquid crystal display polarizer described in item 5, wherein the alicyclic diol is at least one kind selected from the group consisting of spiroglycol, tricyclodecane dimethanol, and cyclohexane dimethanol.
(Item 7) The reflective polarizing film for a liquid crystal display polarizer described in any of items 1 to 6, wherein the number of lamination of the uniaxially stretched multi-layer laminate film is 251 layers or more.
(Item 8) The reflective polarizing film for a liquid crystal display polarizer described in any of items 1 to 7, wherein the uniaxially stretched multi-layer laminate film contains an intermediate layer.
(Item 9) The reflective polarizing film for a liquid crystal display polarizer described in any of items 1 to 8, wherein the polarization degree (P) is 99.9% or more.
(Item 10) The reflective polarizing film for a liquid crystal display polarizer described in any of items 1 to 9, wherein the film is used in adjacent to a liquid crystal cell.
A polarizer for a liquid crystal display (item 11) composed of the reflective polarizing film for a liquid crystal display polarizer described in any of items 1 to 10 is also included in the present invention.
An optical member for a liquid crystal display (item 12) composed of a first polarizer composed of the polarizer for a liquid crystal display described in item 11, a liquid crystal cell, and a second polarizer laminated in this order is also included in the present invention. As a preferable embodiment thereof, any of embodiments described in items 13 to 15 is also included.
(Item 13) The optical member for a liquid crystal display as described in item 12, wherein a configuration in which the first polarizer is laminated with an absorption type polarizer is excluded.
(Item 14) The optical member for a liquid crystal display as described in item 12 or 13, wherein the second polarizer is an absorption type polarizer.
(Item 15) An optical member for a liquid crystal display composed of a lamination of a first polarizer, a liquid crystal cell, and a second polarizer, wherein the first polarizer and the second polarizer are composed of the polarizer for a liquid crystal display as described in item 11.
The present invention further includes the following liquid crystal displays.
(Item 16) A liquid crystal display composed of a light source and the optical member for a liquid crystal display described in any of items 12 to 15, wherein the first polarizer is disposed on the side of the light source.
(Item 17) The liquid crystal display described in item 16, composed of no additional reflective polarizer between the light source and the first polarizer.

Advantageous Effects of Invention

According to the present invention, the uniaxially stretched multi-layer laminate film of the present invention, while being a reflective polarizer composed of a polymer film having a multi-layer structure, has a high polarization performance and additionally eliminates a hue shift at an oblique azimuth of 45°, and thus, can be suitably used as a polarizer for a liquid crystal display that is required to provide a display with higher image quality. Accordingly, an optical member for a liquid crystal display and a liquid crystal display that employ the polarizer as a polarizer disposed adjacent to a liquid crystal cell, can be provided.

BRIEF DESCRIPTION OF DRAWINGS

FIG. 1 shows an example of graphs that represent, against wavelength, the reflectance of polarized light component (P-polarized light component) parallel to the incident plane including stretched direction (X direction) and the reflectance of polarized light component (S-polarized light component) perpendicular to the incident plane including the stretched direction (X direction), wherein the film plane of the uniaxially stretched multi-layer laminate film of the present invention is assigned as a reflection plane.

FIG. 2 shows an example of a transmittance waveform in a wavelength range of 450 to 650 nm measured with respect to the incident polarized light at an incident angle of 60° on an incident plane including an azimuth angle of 45°, among polarized light components parallel to the transmission axis, wherein the film plane of the uniaxially stretched multi-layer laminate film of the present invention is assigned as a reflection plane.

FIG. 3 shows a schematic cross-sectional view of a liquid crystal display according to a preferred embodiment of the present invention.

REFERENCE SIGNS LIST

1 Second polarizer
2 Liquid crystal cell
3 First polarizer
4 Light source
5 Liquid crystal panel

DESCRIPTION OF EMBODIMENT

The reflective polarizing film for a liquid crystal display polarizer of the present invention is a reflective polarizing film for a liquid crystal display polarizer composed of a uniaxially stretched multi-layer laminate film in which a first layer and a second layer are alternately laminated, wherein the reflective polarizing film has a polarization degree (P) represented by the following equation (1) of 99.5% or more:

$$\text{Polarization degree } (P) = \{(Ts-Tp)/(Tp+Ts)\} \times 100 \quad (1)$$

(wherein, in the equation (1), Tp represents an average transmission for P-polarized light in a wavelength range of 400 nm to 800 nm and Ts represents an average transmission for S-polarized light in a wavelength range of 400 nm to 800 nm), and wherein the amplitude of a transmittance waveform in a wavelength range of 450 to 650 nm is 2.0% or less, the amplitude being measured among polarized light components parallel to the transmission axis with respect to the incident polarized light at an incident angle of 60° on an incident plane including an azimuth angle of 45°, when a uniaxially stretched direction (X direction) is assigned to the extinction axis of the reflective polarizing film and a film in-plane direction (Y direction) perpendicular to the uniaxially stretched direction is assigned to the transmission axis of the reflective polarizing film, and X direction is set at an azimuth angle of 0° and Y direction is set at an azimuth angle of 90°.

Hereinafter, each configuration of the present invention is described in detail.

Reflective Polarizing Film
(Polarization Degree)

The reflective polarizing film for a liquid crystal display reflector of the present invention has a polarization degree (P) represented by the following equation (1) of 99.5% or more, preferably 99.6% or more, and still more preferably 99.9% or more:

$$\text{Polarization degree } (P) = \{(Ts-Tp)/(Tp+Ts)\} \times 100 \quad (1)$$

in the equation (1), Tp represents an average transmittance for P-polarized light in a wavelength range of 400 nm to 800 nm and Ts represents an average transmittance for S-polarized light in a wavelength range of 400 nm to 800 nm.

In the reflective polarizing film composed of the uniaxially stretched multi-layer laminate film in which the film plane is assigned as a reflection plane, the P-polarized light in the present invention is defined as a polarized light component parallel to an incident plane that includes the uniaxially stretched direction (X direction). In the reflective polarizing film composed of the uniaxially stretched multi-layer laminate film in which the film plane is selected as a reflection plane, the S-polarized light in the present invention is defined as a polarized light component perpendicular to an incident plane that includes the uniaxially stretched direction (X direction).

In the present invention, the polarization degree is measured by using a polarization degree measurement device.

As the polarization degree specified by the above equation (1) is higher, transmission of reflected polarized light components is suppressed and transmittance of transmitted polarized light components in a direction perpendicular thereto is higher. That is, as the polarization degree is higher, even a slight light leakage of the reflected polarized light components can be reduced. The reflective polarizing film of the present invention has a polarization degree of 99.5% or more, and thus a reflective polarizer alone can be applied as a polarizer to a high contrast liquid crystal display to which conventionally only an absorption type polarizer is applicable.

The high polarization degree can be obtained, using polymers of types described below as the polymers that compose the first layer and the second layer, by establishing a specific relationship between interlayer refractive indexes in X, Y, and Z directions by uniaxially stretching them. Particularly, the alignment characteristics of the uniaxially stretched multi-layer laminate film can be highly regulated by applying toe-out (re-stretching) within a predetermined range and performing heat fixing treatment after uniaxial stretching, thereby attaining a high polarization degree.

Transmittance Waveform at Oblique Azimuth of 45°

When a uniaxially stretched direction (X direction) is assigned to the extinction axis of the reflective polarizing film, a film in-plane direction (Y direction) perpendicular to the uniaxially stretched direction is assigned to the transmission axis of the reflective polarizing film, X direction is at an azimuth angle of 0°, and Y direction is at an azimuth angle of 90°, the uniaxially stretched multi-layer laminate film of the present invention has the amplitude of a transmittance waveform of 2.0% or less in a wavelength range of 450 to 650 nm measured with respect to the incident polarized light at an incident angle of 60° on an incident plate including an azimuth angle of 45°, among polarized light components parallel to the transmission axis.

In the problem of a hue shift when viewed from an oblique direction, which have been investigated so far, attention has been paid mainly on the hue shift with respect to the above S-polarized light or P-polarized light when viewed at an oblique incident angle (right and left viewing angle characteristics), whereas the present invention is intended to eliminate a hue shift when the incident angle is further increased at an oblique azimuth of 45° and is characterized in providing a high viewing angle property with a hue shift eliminated at viewing angles in all the azimuths.

The amplitude of the transmittance waveform is represented by an absolute value determined from the difference between the maximum transmittance and the minimum transmittance of the transmittance waveform, and is preferably 1.8% or less, and more preferably 1.5% or less.

The amplitude of the transmittance waveform can be obtained, by use of polymers of types described below as the polymers that compose the first layer and the second layer, by establishing a specific relationship among interlayer refractive indexes in X, Y, and Z directions by uniaxially stretching them, and additionally, in the film forming process, by lowering the stretching temperature upon stretching than that of conventional processes as well as by reducing the stretching ratio, thereby suppressing the refractive index difference in Z direction of the polymers composing the first layer and the second layer, and subsequently by performing toe-out within a predetermined range and heat fixing treatment.

(S-Polarized Light Average Transmittance)

The reflective polarizing film of the present invention has an average transmittance Ts of S-polarized light, in a wavelength range of 400 nm to 800 nm, of preferably 60% or more, more preferably 70% or more, still more preferably 75% or more, and particularly preferably 80% or more.

The average transmittance for S-polarized light in the present invention represents an average transmittance of the reflective polarizing film composed of the uniaxially stretched multi-layer laminate film, in a wavelength range of 400 nm to 800 nm, for a polarized light component, perpendicular to an incident plane including uniaxially stretched direction (X direction), of the polarized light incident on the film plane is as a reflection plane at an incident angle of 0°.

When the average transmittance for S-polarized light is below the lower limit, even though an optical recycle function of a reflective polarizer is taken into consideration, superiority of a reflective polarizer in luminance enhancing effect becomes diminished compared with an absorption type polarizer. In the optical recycle function, which is a characteristic of the reflective polarizer, reflected polarized light is not absorbed by a polarizer, but reflected to the side of a light source so as to use the light again and efficiently.

Uniaxially Stretched Multi-Layer Laminate Film

The uniaxially stretched multi-layer laminate film of the present invention has a multi-layer structure where a first layer and a second layer are alternately laminated.

In the present invention, the refractive index in the stretched direction (X direction) is referred to as nX, the refractive index in the direction (Y direction) perpendicular to the stretched direction is referred to as nY, and the refractive index in the film thickness direction (Z direction) is referred to as nZ.

First Layer

The polymer composing the first layer is preferably a thermoplastic resin that has an average refractive index of 1.60 or more and 1.70 or less, wherein the refractive index nX in the uniaxially stretched direction (X direction) is increased by stretching, and the refractive index nY in the direction (Y direction) perpendicular in the film plane to the uniaxially stretched direction and the refractive index nZ in the thickness direction (Z direction) are reduced by stretching.

As the first layer of the multi-layer laminate film having a reflective polarizing function, polyethylene-2,6-naphthalene dicarboxylate (hereinafter, referred to as PEN in some cases) has been known as the most suitable material so far. Polyethylene-2,6-naphthalene dicarboxylate is a material that shows no substantial change in the refractive index nY in Y direction before and after stretching, whereas a resin having a characteristic in which the refractive index nY in Y direction is decreased by stretching as well as the refractive index nZ in Z direction is suitably used in the present invention for the polymer composing the first layer.

Here, the average refractive index with respect to the first layer is a value obtained by melting singly the polymer composing the first layer, extruding the melted polymer through a die to form an unstretched film, and measuring the refractive index of the film obtained at a wavelength of 633 nm each in X direction, Y direction, and Z direction using a prism coupler manufactured by Metricon Co., Ltd.

Furthermore, the change in the refractive index after stretching in each direction can be determined by the following method. Namely, the polymer composing the first layer is singly melted and extruded through a die to form a unstretched film. The refractive index of the film obtained was measured at a wavelength of 633 nm each in X direction, Y direction, and Z direction using a prism coupler manufactured by Metricon Co., Ltd. The average refractive index obtained by averaging the refractive indexes in the three directions is assigned to the refractive index before stretching.

Then, for the refractive index after stretching, the polymer composing the first layer is singly melted, extruded through a die, and uniaxially stretched by 5 times at 115° C. to form a uniaxially stretched film. The refractive index of the film obtained was measured at a wavelength of 633 nm each in X direction, Y direction, and X direction using a prism coupler manufactured by Metricon Co., Ltd. The refractive indexes are assigned to the refractive index in each direction after stretching.

Changes in the refractive index change by stretching can be confirmed by comparing the refractive index before stretching and the refractive index after stretching in each direction obtained by the method.

As the polymer composing the first layer, specific examples include aromatic polyester (I) (hereinafter, referred to as aromatic polyester (I) in some cases) or aromatic polyester (II) (hereinafter, referred to as aromatic polyester (II) in some cases) containing an aromatic copolymer component of a specific structure as described below as the dicarboxylic acid component.

<Aromatic Polyester (I)>

An example of one polymer that forms the first layer includes the aromatic polyester (I) that contains an aromatic copolymer component of the following specific structure as the dicarboxylic acid component. The aforementioned polyester is obtained by polycondensation of a dicarboxylic acid component and a diol component described in detail hereinafter.

(Dicarboxylic Acid Component)

A preferable example of the dicarboxylic acid component that composes the aromatic polyester (1) in the present invention includes a naphthalene dicarboxylic acid component in a specific amount of 50 mol % or more and 70 mol % or less and a component represented by the following formula (A) in a specific amount of 25 mol % or more and 50 mol % or less.

[Chem. 1]

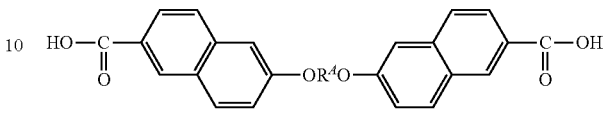

(A)

(wherein, in the formula (A), $R^4$ represents an alkylene group having 2 to 10 carbon atoms.)

By using polyester containing the aforementioned copolymer component and, as further described below, by stretching within the range of specific stretching conditions, the polarization performance can be further enhanced, and additionally, the hue shift tends to be formed less with respect to the polarized light at an oblique azimuth of 45° and incident at an incident angle of 60°.

Examples of the naphthalene dicarboxylic acid component include 2,6-naphthalene dicarboxylic acid, 2,7-naphthalene dicarboxylic acid, a component derived from the combination thereof, or a component derived therefrom. Particularly, preferable examples include 2,6-naphthalene dicarboxylic acid or a component derived therefrom.

The lower limit of the amount of the naphthalene dicarboxylic acid component is preferably 55 mol %, more preferably 60 mol %, and still more preferably 65 mol %.

When the proportion of the naphthalene dicarboxylic acid component is below the lower limit, amorphous property becomes enhanced and the difference between the refractive index nX in X direction and the refractive index nY in Y direction in the stretched film becomes smaller, so that sufficient reflection performance for P-polarized light component is not attained in some cases. When the amount of the naphthalene dicarboxylic acid component is above the upper limit, the difference between the refractive index nY in Y direction and the refractive index nZ in Z direction in the stretched film becomes larger, so that polarization performance deteriorates or the hue shift is developed in the polarized light incident at a large incident angle in some cases.

In this way, by using the polyester containing a naphthalene dicarboxylic acid component, a high refractive index can be exhibited in X direction, and at the same time, a high birefringent performance having uniaxial orientation property is achievable.

Regarding the component represented by the formula (A), in the formula, $R^4$ represents an alkylene group having 2 to 10 carbon atoms. Examples of the alkylene group include an ethylene group, a trimethylene group, an isopropylene group, a tetramethylene group, a hexamethylene group, an octamethylene group and the like. Particularly, an ethylene group is preferable.

The lower limit of the amount of the component represented by the formula (A) is more preferably 30 mol %. The upper limit of the amount of the component represented by the formula (A) is more preferably 45 mol %, still more preferably 40 mol %, and particularly preferably 35 mol %.

The acid component represented by (A) is preferably a component derived from 6,6'-(ethylenedioxy) di-2-naphthoic acid, 6,6'-(trimethylenedioxy) di-2-naphthoic acid, or 6,6'-(butylenedioxy) di-2-naphthoic acid. Among these, a component having an even number of carbon atoms of $R^A$ in the formula (A) is preferable. Particularly, a component derived from 6,6'-(ethylenedioxy) di-2-naphthoic acid is preferable.

The aromatic polyester (1) preferably contains, as the dicarboxylic acid component other than the naphthalene dicarboxylic acid component, the component represented by the formula (A) in a specific amount. By containing the component represented by the formula (A) in a specific amount, the difference between the refractive index nY in Y direction and the refractive index nZ in Z direction in the first layer of the stretched film becomes small. Thus, polarization performance can be still more enhanced. Also, the hue shift is not easily developed by the polarized light incident at a large incident angle. When the proportion of the component represented by the formula (A) is above the upper limit, amorphous property becomes enhanced and the difference between the refractive index nX in X direction and the refractive index nY in Y direction in the stretched film becomes smaller. Thus, the difference in interlayer refractive indexes in the stretching direction (X direction) between the first layer and the second layer cannot be increased, and sufficient reflection performance for P-polarized light component cannot be attained in some cases.

(Diol Component)

As the diol component that composes the aromatic polyester (1) in the present invention, a diol component having an alkylene group having 2 to 10 carbon atoms is preferably contained in an amount of 90 mol % or more and 100 mol % or less. Here, the amount of the diol component is based on the total mol number of the diol components.

The amount of the diol component is more preferably 95 mol % or more and 100 mol % or less, and still more preferably 98 mol % or more and 100 mol % or less.

Examples of the alkylene group include an ethylene group, a propylene group, an isopropylene group, a tetramethylene group, a hexamethylene group, an octamethylene group and the like. Among these, ethylene glycol, trimethylene glycol, tetramethylene glycol, cyclohexane dimethanol and others are preferably cited. Ethylene glycol is particularly preferable. When the proportion of the diol component is below the lower limit, the aforementioned uniaxial alignment may be impaired.

As a preferable embodiment of the aromatic polyester (1) in the present invention, in a particularly preferable polyester, the naphthalene dicarboxylic acid component is derived from 2,6-naphthalene dicarboxylic acid, the dicarboxylic acid component represented by the formula (A) is derived from 6,6'-(ethylenedioxy) di-2-napthoic acid, and the diol component is ethylene glycol.

A component such as the naphthalene dicarboxylic acid component and the component represented by the formula (A) that have aromatic rings mainly has an effect of attaining a high refractive index in X direction through stretching. Furthermore, when the component represented by the formula (A) is included, the refractive index in Y direction tends to be easily lowered by stretching. Specifically, the component represented by the formula (A) has a molecular structure in which two aromatic rings are bonded to each other by an ether bonding through an alkylene chain, so that these aromatic rings tend to easily rotate during uniaxial stretching in a direction different from the plane direction and that the refractive index in Y direction of the first layer tends to be easily lowered by stretching.

On the other hand, because the diol component of the aromatic polyester (1) in the present invention is aliphatic, the effect of the diol component on the refractive index characteristics of the first layer is less pronounced as compared with the dicarboxylic acid component of the present invention.

The aromatic polyester (1) has an intrinsic viscosity of preferably 0.4 dL/g to 3 dL/g, more preferably 0.4 dL/g to 1.5 dL/g, and particularly preferably 0.5 dL/g to 1.2 dL/g, as measured by using a mixed solvent of p-chlorophenol/1,1, 2,2-tetrachloroethane (40/60 by weight ratio) at 35° C.

The melting point of the aromatic polyester (1) is preferably in a range of 200° C. to 260° C., more preferably 205° C. to 255° C., and still more preferably 210° C. to 250° C. The melting point can be determined by measurement using DSC.

When the melting point of the polyester is above the upper limit, upon molding through melt extrusion, fluidity becomes degraded and extrusion may become non-uniform in some cases. On the other hand, when the melting point is below the lower limit, although good film formability is attained, mechanical properties of the polyester become easily damaged and the refractive index characteristics of the present invention may be difficult to be exhibited.

In general, a copolymer has a lower melting point as compared with a homopolymer, and the mechanical strength thereof has a tendency of being lowered. However, in the case of a copolymer containing the naphthalene dicarboxylic acid component and the component of the formula (A), the copolymer exhibits such excellent performances, wherein it exhibits a mechanical strength comparable to that of a homopolymer containing only the naphthalene dicarboxylic acid component or a homopolymer containing only the component of the formula (A), although the melting point is lower than that of the homopolymers.

The glass transition temperature (hereinafter, referred to as Tg in some cases) of the aromatic polyester (1) is in a range of preferably 80° C. to 120° C., more preferably 82° C. to 118° C., and still more preferably 85° C. to 118° C. When Tg is in this range, a film having excellent heat resistance and dimensional stability is obtainable. The melting point and the glass transition temperature are adjustable by the kinds and copolymerization amount of copolymer components, regulation of dialkylene glycol that is a byproduct, and others.

The aromatic polyester (1) containing the naphthalene dicarboxylic acid component and the component represented by the formula (A) may be produced in accordance with a method described, for example, in page 9 of International Publication No. WO 2008/153188.

(Refractive Index Characteristics of Aromatic Polyester (1))

When the aromatic polyester (1) containing the aforementioned specific copolymer component is used for the first layer and uniaxial stretching is applied, the refractive index nX in X direction of the first layer exhibits a high refractive index characteristic of 1.80 to 1.90. When the refractive index in X direction in the first layer is in the above range, the difference in the refractive index with respect to the second layer becomes large, and sufficient reflective polarization performance can be exhibited.

In addition, the difference between the refractive index nY in Y direction after uniaxial stretching and the refractive index nZ in Z direction after uniaxial stretching is preferably 0.05 or less, more preferably 0.03 or less, and particularly preferably 0.01 or less. When the difference between these two directions is extremely small, an effect of suppressing the hue shift is exhibited even through polarized light enters at a large incident angle.

On the other hand, when the polyester that composes the first layer is polyethylene-2,6-naphthalene dicarboxylate (homo PEN), as shown in FIG. 1, regardless of the stretching ratio in the uniaxial direction, the refractive index nY in Y direction remains constant and shows no lowering, while the refractive index nZ in Z direction lowers as the stretching ratio in uniaxial direction increases. Accordingly, the difference between the refractive index nY in Y direction and the refractive index nZ in Z direction becomes large, and the hue shift becomes easily developed when polarized light enters at an oblique incident angle.

<Aromatic Polyester (II)>

A preferable example of the polymer composing the first layer of the present invention also includes an aspect of the following aromatic polyester (II) besides the aromatic polyester (I).

Specifically, in place of the component of the formula (A) of the aromatic polyester (I), there is mentioned an aromatic polyester that contains a component represented by the following formula (B) as the dicarboxylic acid component in the range of 25 mol % or more and 50 mol % or less.

[Chem. 2]

(B)

(wherein, in the formula (B), $R^B$ represents a biphenyl group.)

Among the dicarboxylic acid component and diol component composing the aromatic polyester (II), for the composition besides the component represented by the formula (B), the components same as in the aromatic polyester (I) can be used, and the amounts are also in accordance with the aromatic polyester (I).

The melting point of the aromatic polyester (II) containing the aforementioned copolymer component is preferably in the range of 250 to 280° C. and other characteristics are in accordance with the aromatic polyester (I).

Second Layer

In the present invention, the second layer of the uniaxially stretched multi-layer laminate film is preferably composed of a copolymer polyester and has preferably an average refractive index of 1.50 or more and 1.60 or less, and is preferably isotropic.

The average refractive index of the second layer is specified as: the copolymer polyester that composes the second layer is melt and extruded through a die to form an unstretched film, which is then uniaxially stretched by 5 times at 115° C. to obtain a uniaxially stretched film; refractive indexes at a wavelength of 633 nm are measured in each direction of X, Y, and Z of the resulting film using a prism coupler manufactured by Metricon Co., Ltd.; and the average value thereof is specified as the average refractive index.

Optical isotropy means that difference in refractive indexes between any two directions among X, Y, and Z directions is 0.05 or less and preferably 0.03 or less.

The average refractive index of the copolymer polyester that composes the second layer is preferably 1.53 or more and 1.60 or less, more preferably 1.55 or more and 1.60 or less, and still more preferably 1.58 or more and 1.60 or less. When the second layer has an average refractive index in the above range and is found to be an optically isotropic material as evidenced by the small differences in the refractive indexes among any of directions when stretched, refractive index characteristics can be obtained, in which the difference in refractive indexes in X direction between the first layer and the second layer after stretching is large and at the same time the difference in the interlayer refractive indexes in Y direction is small. Accordingly, polarization performance can be highly enhanced, which is preferable. In addition, when the component represented by the formula (A) or the formula (B) is used as a copolymer component of the first layer, not only the aforementioned characteristics of the interlayer refractive index differences in X and Y directions, but also the refractive index differences in Z direction are small. Furthermore, the hue shift caused by an oblique incident angle is suppressed, which is preferable.

The second layer of the present invention may contain, within a range of not affecting the polarization degree in the present invention, a thermoplastic resin other than the copolymer polyester in a range of 10 wt % or less on the basis of the weight of the second layer as a second polymer component.

In the present invention, the aforementioned copolymer polyester of the second layer has a glass transition temperature of preferably 90° C. or higher, more preferably 90° C. or higher and 150° C. or lower, and particularly preferably 90° C. or higher and 120° C. or lower. When the copolymer polyester of the second layer has a glass transition temperature below the lower limit, heat resistance at 90° C. may not be sufficiently achieved in some cases. When a step such as heat treatment around this temperature is involved, an increase in haze occurs because of crystallization or embrittlement of the second layer, which may be accompanied by decrease in the polarization degree. On the other hand, when the copolymer polyester of the second layer has a glass transition temperature that is too high, birefringence caused by stretching may be developed in the polyester of the second layer upon stretching. Accordingly, the difference in refractive indexes between the first and second layers becomes small in the stretching direction and the reflection performance may be reduced.

Of the copolymer polyester that has the aforementioned refractive index characteristics, from the viewpoint of a complete absence of the haze increase caused by crystallization in a heat treatment at 90° C. for 1000 hours, an amorphous copolymer polyester is preferable. Here, amorphous means that crystal fusion heat determined by the differential scanning calorimetry (DSC) at a temperature rise rate of 20° C./minute is less than 0.1 mJ/mg.

Examples of the amorphous copolymer polyester that has the aforementioned refractive index characteristics include, preferably, copolymer polyethylene terephthalate, copolymer polyethylene naphthalene dicarboxylate, or a blend thereof, and a polycyclohexanedimethylene terephtalate-isophtalate copolymer. Of these, copolymer polyethylene terephthalate is preferable. Of the copolymer polyethylene terephthalates, preferable is a copolymer polyethylene terephthalate which contains at least one kind selected from isophthalic acid, naphthalene dicarboxylic acid, and alicyclic diols, as the copolymer component. Preferable examples of the alicyclic diol include at least one kind selected from spiroglycol, tricyclodecane dimethanol, and cyclohexane dimethanol.

Among these, copolymer polyester containing an alicyclic diol as the copolymer component is preferable. Particularly, copolymer polyethylene terephthalate containing an alicyclic diol as the copolymer component is preferable. Particularly, polyester mainly composed of an ethylene terephthalate component obtained by copolymerizing 2,6-naphthalene dicarboxylic acid and spiroglycol is preferable.

Spiroglycol is preferable from the viewpoint of having a larger crystal binding force as compared with other alicyclic diol components such as cyclohexane dimethanol and suppressing the increase in haze caused by crystallization of the second layer during long time heat treatment at 90° C. for 1000 hours.

In addition, as the preferable copolymer polyester for the second layer other than the copolymer polyester containing alicyclic diol, there is mentioned a copolymer polyester containing one or two kinds of aromatic dicarboxylic acid as the copolymer component. A preferable example includes copolymer polyethylene terephthalate containing naphthalene dicarboxylic acid as the copolymer component. The copolymerization amount thereof is adjusted such that the glass transition temperature becomes 90° C. or higher.

Note that, when alicyclic diol is contained as the copolymer component, the relationship with the refractive index of the first layer polyester is more easily adjusted.

When the copolymer component that composes the copolymer polyester of the second layer is only alicyclic diol, spiroglycol is preferable. The copolymerization amount is preferably 10 mol % to 40 mol %. When the copolymer component that composes the copolymer polyester of the second layer consists of alicyclic diol and other copolymer components, preferably, alicyclic diol is 10 mol % to 30 mol % and the other copolymer components are 10 mol % to 60 mol %.

Here, the copolymerization amount in the case where the second layer is composed of the copolymer polyester in the present invention is explained by taking copolymer polyethylene terephthalate as an example. The copolymerization amount is represented in terms of a proportion of minor copolymer components with respect to the repeating units of the polyester that compose the second layer as 100 mol %. The minor components are represented by the total amount of components excluding the ethylene glycol component in the diol component and the terephthalic acid component in the dicarboxylic acid component.

In addition, the copolymer polyester of the second layer may contain, within a range of 10 mol % or less, as a copolymer component besides the aforementioned components: an aliphatic dicarboxylic acid such as adipic acid, azelaic acid, sebacic acid, decane dicarboxylic acid and the like; an acid component including alicyclic dicarboxylic acid such as cyclohexane dicarboxylic acid and the like; and a glycol component including aliphatic diol such as butane diol, hexane diol and the like.

The aforementioned copolymer polyester has an intrinsic viscosity as measured using an o-chlorophenol solution at 35° C. of preferably 0.55 dL/g to 0.75 dL/g and more preferably 0.60 dL/g to 0.70 dL/g.

In the copolymer polyester that has the aforementioned glass transition temperature, an alicyclic diol component and the like is used as the copolymer component, so that tearing strength particularly in unstretched direction becomes easily degraded. Therefore, by adjusting the intrinsic viscosity of the copolymer polyester within the aforementioned range, resistance against tearing may be enhanced. The intrinsic viscosity of the aforementioned copolymer polyester when used as the second layer is preferably higher from the viewpoint of the resistance against tearing. However, when the intrinsic viscosity exceeds the upper limit, difference in melt viscosity from that of the aromatic polyester of the first layer become larger, which may cause non-uniformity in the thickness of each layer.

Buffer Layer, Intermediate Layer

The uniaxially stretched multi-layer laminate film in the present invention may contain an intermediate layer besides the first and second layers. The intermediate layer preferably has a thickness of 2 μm or more and 30 μm or less, and the multi-layer laminate film may contain the intermediate layer inside of the alternately laminated configuration of the first and second layers.

While the intermediate layer is sometimes referred to as an inner thick film layer in the present invention, it is referred to a thick film layer disposed inside of the alternately laminated configuration. In the present invention, in a preferable method, thick film layers (referred to as thickness conditioning layer or buffer layer in some cases) are formed on both sides of an alternate laminate consisting of 300 or less layers in an initial step of producing a multi-layer laminate film, and then the number of lamination is increased by doubling. In this case, a method in which two buffer layers are laminated with each other to form an intermediate layer is preferable.

When the intermediate layer having such thickness is included as a part of the alternately laminated configuration of the first and second layers, it becomes easier to adjust uniformly the thickness of each layer that composes the first and second layers, without bringing about any effect on the polarization function. The intermediate layer having such thickness may have the same composition with either of the first layer and the second layer or may have a composition that partly contains the same composition. The layer thickness is so large that it does not contribute to the reflective characteristics. On the other hand, when particles are included in the layer, transmitted polarized light is sometimes affected so that they are preferably included in a range of the particle concentration described in the explanation of particles.

When the thickness of the intermediate layer is below the lower limit, the layer structure of the alternately laminated configuration portion may be disordered, and the reflection performance may be reduced. On the other hand, when the thickness of the intermediate layer is above the upper limit, the whole thickness of the uniaxially stretched multi-layer laminate film becomes thicker after lamination, which may make it difficult to attain space-saving when used as a polarizer of a thin-type liquid crystal display device. In addition, when a plurality of intermediate layers is included in the uniaxially stretched multi-layer laminate film, the thickness of each intermediate layer is preferably within the aforementioned range.

Regarding the polymer used for the intermediate layer, a resin that is different from the first layer or the second layer may be used when the resin is allowed to be included in the multi-layer structure by using the method of producing the uniaxially stretched multi-layer laminate film of the present invention. However, considering interlayer adhesion, a resin having the same composition with any of the first layer and the second layer is preferable, or a resin having a composition that partly contains the same composition may be allowed.

The method of forming the intermediate layer is not particularly limited, however, for example, as described later in the method of producing the uniaxially stretched multi-layer laminate film, one layer of the inner thick film (intermediate layer) may be formed as: thick film layers (buffer layer) are formed on both sides of an alternately laminated body that has 300 or less layers before performing doubling; the resulting assembly is divided into two parts by using a branching block called as a layer doubling block; and then they are laminated again. By using the same procedure, through three branching or four branching, a plurality of intermediate layers may also be formed.

Laminate Configuration of Uniaxially Stretched Multi-Layer Laminate Film (Number of Lamination)

In the uniaxially stretched multi-layer laminate film of the present invention, the aforementioned first and second layers are preferably alternately laminated in a total lamination number of 251 layers or more. When the number of lamination is less than 251 layers, regarding an average reflection characteristic of a polarized light component parallel to an incidence plane including stretched direction (X direction), a specific average reflection over a wavelength range of 400 nm to 800 nm may not be attained.

The upper limit value of the number of lamination is preferably 2001 layers or less considering productivity and handling property of films. However, as long as a target average reflection characteristic is attained, the number of lamination may be further reduced considering productivity and the handling property. For example, 1001 layers, 501 layers, or 301 layers are acceptable.

(Thickness of Each Layer)

The thickness of each layer in the first and second layers is preferably 0.01 μm or more and 0.5 μm or less. The thickness of each layer in the first layer is preferably 0.01 μm or more and 0.1 μm or less. The thickness of each layer in the second layer is preferably 0.01 μm or more and 0.3 μm or less. The thickness of each layer is obtained on the basis of pictures taken by using a transmission electron microscope.

Since the uniaxially stretched multi-layer laminate film of the present invention is used as a reflective polarizer for a liquid crystal display, the reflection wavelength range is preferably from visible light region to near-infrared light region. By way of specifying the thickness of each layer in the first and second layers within the aforementioned range, light in the aforementioned wavelength region is allowed to be reflected selectively by interlayer optical interferences. On one hand, when the thickness of the layer is more than 0.5 μm, the reflection range is in the infrared light region. On the other hand, when the thickness is less than 0.01 μm, the polyester component absorbs light and the reflection performance is not attained.

(Ratio Between Maximum Layer Thickness and Minimum Layer Thickness)

In the uniaxially stretched multi-layer laminate film of the present invention, the ratio between the maximum layer thickness and the minimum layer thickness in each of the first layer and the second layer is preferably 2.0 or more and 5.0 or less, more preferably 2.0 or more and 4.0 or less, still more preferably 2.0 or more and 3.5 or less, and particularly preferably 2.0 or more and 3.0 or less. The ratio of layer thicknesses is represented, specifically, by the ratio of the maximum layer thickness to the minimum layer thickness. The maximum layer thickness and the minimum layer thickness in each of the first layer and the second layer are determined on the basis of pictures taken by using a transmission electron microscope.

In a multi-layer laminate film, a wavelength of the light to be reflected by the film is determined by the difference in refractive indexes between layers, number of layers, and thicknesses of layers. When each of the laminated layers of the first layer and the second layer has a constant thickness, only the light of a specific wavelength is reflected. If this is the case, regarding the average reflection characteristic of a polarized light component parallel to an incidence plane including the stretched direction (X direction), the average reflectance may not be enhanced uniformly over a wide wavelength range of 400 nm to 800 nm. For this reason, layers that have different thicknesses are preferably used.

On the other hand, when the ratio between the maximum layer thickness and the minimum layer thickness is above the upper limit value, the reflection wave length range becomes wider than 400 nm to 800 nm, which may bring about lowering in the reflection of a polarized light component parallel to incidence plane including the stretched direction (X direction).

The thickness of each of the layers of the first layer and the second layer may change stepwise or continuously. The change pattern in each of the laminated layers of the first and second layers as described above enables light reflection in a wider wavelength range.

In the uniaxially stretched multi-layer laminate film of the present invention, a method of laminating multi-layer structure is not particularly limited, but, for example, there may be mentioned a method of using a multi-layer feed block apparatus, wherein the first layer in which the polyester for the first layer is branched into 137 layers and the second layer in which the polyester for the second layer is branched into 138 layers are alternately laminated and the flow channel thereof changes continuously by 2.0 to 5.0 times.

(Ratio of Average Layer Thicknesses Between the First and Second Layers)

In the uniaxially stretched multi-layer laminate film of the present invention, the ratio of the average layer thickness of the second layer to the average layer thickness of the first layer is preferably in a range of 0.5 or more time and 4.0 or less times. The lower limit value in the ratio of the average layer thickness of the second layer to the average layer thickness of the first layer is more preferably 0.8. The upper limit value of the ratio in the average layer thickness of the second layer with respect to the average layer thickness of the first layer is more preferably 3.0. The most preferable range is 1.1 or more and 3.0 or less.

By optimizing the ratio of the average layer thickness of the second layer to the average layer thickness of the first layer, light leakage due to multiple reflections can be further improved. The ratio of the thickness thus optimized is referred to a thickness at which the value represented by (refractive index of the first layer in stretched direction)×(average layer thickness of the first layer) and the value represented by (refractive index of the second layer in stretched direction)×(average layer thickness of the second layer) become equal. A preferable range of the ratio of the average layer thickness of the second layer to the average layer thickness of the first layer is about 1.1 to about 3.0 in terms of refractive index characteristics of each layer according to the present invention.

Uniaxially Stretched Film

The uniaxially stretched multi-layer laminate film of the present invention is stretched in at least uniaxial direction in order to attain optical characteristics as a target reflective polarizing film. The uniaxially stretched film in the present invention includes not only a film stretched only in uniaxial direction but also a film that is stretched in biaxial direction and is more stretched in one of two directions. The uniaxially stretched direction (X direction) may be any of the longitudinal direction and the widthwise direction of the film. In the case of the film that is stretched in biaxial direction and more stretched in one of two directions, the direction (X direction) in which it is more stretched may be any of the longitudinal direction and the widthwise direction of the film. In a direction having a low stretching ratio, the stretching ratio is kept to be preferably about 1.05 to about 1.20 from the viewpoint of enhancing polarization performance. In the case of the film stretched in biaxial direction and more stretched in one of two directions, "stretched direction" represents the more stretched direction in relation to polarization or refractive index.

As a stretching method, conventional stretching methods are usable, which include heat stretching using a bar heater, roll heat stretching, tenter stretching and the like. Considering reduction of scratches due to contact with rolls or considering the stretching speed, tenter stretching is preferable.

Interlayer Refractive Index Characteristics of First and Second Layers

The difference in X direction refractive indexes between the first layer and the second layer is preferably 0.10 to 0.45, more preferably 0.20 to 0.40, and particularly preferably 0.25 to 0.30. When the difference in X direction refractive indexes is in the above range, the reflective characteristics can be enhanced effectively, and a high refractive index can be obtained using less number of lamination.

The difference in Y direction refractive indexes between the first layer and the second layer and the difference in Z direction refractive indexes between the first layer and the second layer are each preferably 0.05 or less. The differences in the interlayer refractive indexes each in Y direction and Z direction in the above range can suppress the hue shift by the polarized light incident at a large incident angle, thus preferable. The polarized light as referred to herein is not polarized light in terms of an oblique azimuth of 45°, which is a characteristic of the present invention, but is polarized light in terms of a hue shift when S-polarized light or P-polarized light, conventionally investigated, is incident at an oblique incident angle.

Namely, with respect to P-polarized light parallel to or S-polarized light perpendicular to an incident plane including the stretched direction (X direction, referred to as in the present invention, or the extinction axis direction) of the film, an observed hue shift (right and left viewing angle characteristics) by the polarized lights incident at an oblique incident angle on an incident plane including the stretched direction (X direction, referred to as in the present invention, or the extinction axis direction) of the film can be eliminated, which is preferable.

(Average Reflectance)

In the uniaxially stretched multi-layer laminate film of the present invention in which the film surface is used as a reflection plane, a polarized light component parallel to an incident plane including the stretched direction (X direction) of the uniaxially stretched film preferably has an average reflectance of 98% or more and 100 or less in a wavelength range of 400 nm to 800 nm with respect to the polarized light incident at an incident angle of 0°. Since the average reflectance of P-polarized light component is high as described above, a high polarization performance of transmitting selectively S-polarized light while suppressing transmission of P-polarized light than before is exhibited and a high polarization degree of 99.5% or more is attained. Therefore, without using an absorption type polarizer in combination, the uniaxially stretched multi-layer laminate film alone can be used as a polarizer disposed adjacent to a liquid crystal cell. At the same time, P-polarized light perpendicular to the transmission axis is not absorbed by the uniaxially stretched multi-layer laminate film but is highly reflected, so that the film also exhibits a function as a luminance enhancing film that enables the reuse of the reflected light.

Further, the uniaxially stretched multi-layer laminate film of the present invention in which the film surface is used as a reflection plane has an average reflectance in a wavelength range of 400 nm to 800 nm, for a polarized light component perpendicular to an incident plane including the stretched direction (X direction) of the uniaxially stretched film, of preferably 40% or less, more preferably 35% or less, still more preferably 30% or less, particularly preferably 20% or less, and most preferably 15% or less, wherein the polarized light is incident at an incident angle of 0°. In addition, the lower limit of the average reflectance for the polarized light incident at an incident angle of 0° in the wavelength range of 400 nm to 800 nm is preferably 5%.

When the average reflectance in the wavelength range of 400 nm to 800 nm for S-polarized light component incident in the perpendicular direction is in the aforementioned range, the amount of S-polarized light transmitted to the opposite side of light source increases. On one hand, when the average reflectance for S-polarized light component is above the upper limit value, the polarized light transmittance of the uniaxially stretched multi-layer film is lowered, and thus sufficient performance may not be exhibited when the film is used as a polarizer disposed adjacent to a liquid crystal cell. On the other hand, in the aforementioned range, as the reflectance of S-polarized light component is lower, the transmittance for S-polarized light component becomes higher. However, lowering below the lower limit value is sometimes difficult in relation to compositions or stretching.

In order to attain the aforementioned average reflectance characteristics for P-polarized light component, in the uniaxially stretched multi-layer laminate film composed by alternate lamination of the first layer and the second layer, polyesters, each of which has the aforementioned characteristics, are used as a polymer that composes each layer, and a film in-plane direction of the first layer is rendered to be birefringent by stretching in the stretching direction (X direction) at a specified stretching ratio. Accordingly, the difference in refractive indexes in the stretching direction (X direction) between the first layer and the second layer is made to be large, and thus, the above objective is attained. In addition, in order to attain the aforementioned average reflectance in the wavelength range of 400 nm to 800 nm, there may be mentioned a method of adjusting each thickness of the layers of the first layer and the second layer.

Furthermore, in order to attain the aforementioned average reflectance performance for S-polarized light component, in the uniaxially stretched multi-layer laminate film composed by alternate lamination of the first layer and the second layer, the aforementioned polyester is used as a polymer constituent that composes each layer and no stretching is applied or stretching is kept to a low stretching ratio in a direction (Y direction) perpendicular to the stretching direction. In this way, the difference in refractive indexes in the perpendicular direction (Y direction) between the first layer and the second layer is made to be extremely small, and thus the above objective is attained. In addition, in order to attain the aforementioned average reflectance in the wavelength range of 400 nm to 800 nm, there may be mentioned a method of adjusting each thickness of the layers of the first layer and the second layer.

Film Thickness

The film thickness of the uniaxially stretched multi-layer laminate film of the present invention is preferably 15 μm or more and 200 μm or less and more preferably 50 μm or more and 180 μm or less.

Intrinsic Viscosity

The uniaxially stretched multi-layer laminate film of the present invention has an intrinsic viscosity of preferably 0.55 dL/g or more and 0.75 dL/g or less and more preferably 0.57 dL/g or more and 0.70 dL/g or less. When the intrinsic viscosity of the film is below the lower limit value, tearing strength in unstretched direction lowers and fracturing sometimes occurs in the step of producing the uniaxially stretched multi-layer laminate film or in the step of producing optical members for liquid crystal display devices. On the other hand, when the intrinsic viscosity of the film is above the upper limit value, melt viscosity increases and the productivity may be decreased.

Wide-Angle X Ray Diffraction Measurement

The uniaxially stretched multi-layer laminate film of the present invention preferably has no diffraction peak of the (−110) crystal plane derived from the crystalline structure of the alkylene naphthalate in wide-angle X-ray diffraction measurement.

When the diffraction peak of a (−110) crystal plane derived from the crystalline structure of the alkylene naphthalate is high, a film in-plane direction of the first layer is rendered to be birefringent. Accordingly the difference in refractive indexes in the stretching direction (X direction) between the first layer and the second layer can be made to be large, and the polarization degree becomes easy to increase. However, due to increase in the plane alignment component, differences in interlayer refractive indexes each in Y direction and Z direction may occur even with a composition as in the aromatic polyester (I) or aromatic polyester (II), and a hue shift may occur with respect to the polarized light at an oblique azimuth of 45° specified in the present invention.

Accordingly, a stretching temperature and a stretching ratio are preferably selected in the range that no diffraction peak of the (−110) crystal plane derived from the crystalline structure of an alkylene naphthalate is observed in wide-range X ray diffraction measurement.

Method of Producing Uniaxially Stretched Multi-Layer Laminate Film

Hereinafter, a method of producing the uniaxially stretched multi-layer laminate film of the present invention is described in detail.

In the uniaxially stretched multi-layer laminate film of the present invention, the number of lamination is increased in the following manner: An alternately laminated body having 300 layers or less in total is prepared by alternately laminating a polymer that composes the first layer and a polymer that composes the second layer in a fused state; thick layers (buffer layers) are disposed on both sides thereof; the alternately laminated body having the buffer layers are branched into 2 to 4 using a device called a layer doubling; and the resulting blocks of the alternately laminated body having the buffer layers are laminated again in a manner such that the number of lamination (the number of doubling) of the blocks becomes 2 to 4 times. By using the method described above, the uniaxially stretched multi-layer laminate film having an intermediate layer composed of two buffer layers laminated to each other is obtained.

The alternately laminated body is laminated in a manner such that the thickness of each layer changes stepwisely or continuously in a range of 2.0 to 5.0 times.

The unstretched multi-layer film laminated in a desired number of lamination by the method described above is stretched at least in one axial direction (in a direction along the film surface) including a film-forming direction or a widthwise direction perpendicular to the film-forming direction. The stretching temperature is in the range of the glass transition temperature of the first layer polymer (Tg) to (Tg+20)° C. The orientation characteristics of the film can be highly regulated by stretching at a temperature lower than that of conventional stretching.

The stretching ratio at this time is 2 times to 5.8 times, and more preferably 4.5 times to 5.5 times. In the aforementioned range, as the stretching ratio is larger, unevenness in the plane direction of each layer in the first layer and the second layers is made to be smaller by thinning the film through stretching. Accordingly, optical interference of the stretched multi-layer film is equalized in the plane direction, and the difference in refraction indexes in the stretched direction between the first layer and the second layer becomes larger, which is preferable. As a stretching method used in this case, conventional stretching methods are usable, which include heat stretching with a bar heater, roll heat stretching, tenter stretching, and the like. Considering reduction of scratches caused by contact with rolls or considering the stretching speed, tenter stretching is preferable. In contrast, when stretching is performed at a ratio above the upper limit, due to increase in the plane orientation component of the first layer, differences in interlayer refractive indexes each in Y direction and Z direction occurs even with the composition of the aromatic polyester (I) or aromatic polyester (II). Accordingly, the amplitude of the transmittance waveform at an oblique azimuth of 45° specified in the present invention is increased, resulting in increase in the hue shift.

In addition, the stretching temperature is brought to a lower temperature region of the glass transition temperature of the polymer of the first layer (Tg) to (Tg+13)° C., and the stretching ratio is brought to a preferable range. This allows the waveform at the oblique azimuth of 45° to be smaller, enabling the hue shift to be highly regulated.

In addition, in the case of performing biaxial stretching, that is, stretching additionally in a direction (Y direction) perpendicular to the stretched direction, the stretching ratio is kept preferably at about 1.05 to 1.20 times. When the stretching ratio in Y direction is larger than this, polarization performance may deteriorate.

Furthermore, the orientation characteristics of the resulting uniaxially stretched multi-layer laminate film can be highly regulated by applying toe-out (re-stretching) within a range of 5% to 15% in the stretched direction while performing an additional heat fixing treatment at a temperature of (Tg) to (Tg+30)° C. after the stretching.

Reflective Polarizing Film for Liquid Crystal Display Polarizer

The uniaxially stretched multi-layer laminate film of the present invention, while it is a reflective polarizing film having a multi-layer structure, has a high polarization degree of 99.5% or more and a function as a luminance enhancing film that is capable of reflecting untransmitted polarized light for reuse. Furthermore, since a hue shift at an oblique azimuth of 45° is eliminated, the film can be used as a polarizer for a liquid crystal display which is used alone adjacent to a liquid crystal cell without using an absorption type polarizer in combination. In particular, when the film is used as the polarizer for a large-screen liquid crystal display, a high performance large-screen liquid crystal display can be provided which exhibits little hue shift when viewed from all the viewing angles and provides high reproducibility of the hue.

Optical Member for Liquid Crystal Display

The present invention includes, as an embodiment thereof, an optical member for a liquid crystal display. The member is composed of a first polarizer composed of the polarizer for a liquid crystal display of the present invention, a liquid crystal cell, and a second polarizer, which are laminated in this order. The optical member is also referred to as a liquid crystal panel. The optical member corresponds to 5 in FIG. 3, the first polarizer corresponds to 3, the liquid crystal cell corresponds to 2, and the second polarizer corresponds to 1.

Conventionally, high polarization performance was obtained by including at least an absorption type polarizer disposed on both sides of a liquid crystal cell. The polarizer that uses the uniaxially stretched multi-layer laminate film of the present invention is capable of providing high polarization performance that cannot be achieved by conventional multi-layer laminate films, so that it is usable, in place of the absorption type polarizer, as a polarizer used adjacent to the liquid crystal cell.

Namely, features of the present invention are present in an aspect of using the polarizer alone, which is composed of the uniaxially stretched multi-layer laminate film of the present invention, as the first polarizer on one side of a liquid crystal cell. Preferably, a configuration in which the first polarizer is laminated with the absorption type polarizer is eliminated.

The kind of the liquid crystal cell is not particularly limited, and any type is usable, such as VA mode, IPS mode, TN mode, STN mode, and Bend alignment (π type) and the like. Of these, the present invention is particularly preferably used in the VA mode or IPS mode, which generally requires high viewing angle characteristics at an oblique azimuth of 45°.

Furthermore, the kind of the second polarizer is not particularly limited, and any of the absorption type polarizer and the reflective polarizer is usable. When the reflective polarizer is used as the second polarizer, the polarizer for a liquid crystal display of the present invention is preferably used.

The optical member for a liquid crystal display of the present invention is preferably laminated in the order of the first polarizer, a liquid crystal cell, and the second polarizer. Each of these elements may be directly laminated with each other or may be laminated interposing therebetween a layer, which is referred to as an adhesive layer or a bonding layer and enhances adhesive property between layers (hereinafter, referred to as an adhesive layer) or a protective layer.

Formation of Optical Member for Liquid Crystal Display

In a preferred method of disposing polarizers to the liquid crystal cell, both are laminated interposing an adhesive layer therebetween. Adhesives that form the adhesive layer is not particularly limited, and an adhesive in which a polymer such as acrylic-based polymer, silicone-based polymer, polyester, polyurethane, polyamide, polyether, fluoro-based polymer, rubber-based polymer and the like is used as a base polymer may be appropriately selected and used. Particularly, a preferred adhesive has an excellent transparency like an acrylic-based adhesive and an adhesive performance with appropriate wettability, aggregability and adhesion, and also is excellent in weather resistance, heat resistance, and others. The adhesive layer may be provided in a plurality of layers having different compositions or of different kinds.

Considering workability in the course of laminating the liquid crystal cell and the polarizers, the adhesive layer is preferably disposed in advance on one or both of the liquid crystal cell and the polarizer. The thickness of the adhesive layer is appropriately selected in accordance with purposes of use, adhesion, and others. The thickness is generally 1 µm to 500 µm, preferably 5 µm to 200 µm, and particularly preferably 10 µm to 100 µm.

(Separating Film)

Furthermore, to the exposed face of the adhesive layer is preferably temporarily, until being provided for practical use, attached and covered by a separating film (separator) for the purpose of preventing contamination and others. This prevents the adhesive layer from being touched under a usual handling condition. As the separating film, for example, plastics film, rubber sheet, paper, cloth, nonwoven cloth, net, foamed sheet, metal foil, laminated bodies thereof, and others are used, which are, if needed, coated with a separating agent such as silicone-based, long chain alkyl-based, fluoro-based, molybdenum sulfide and the like.

Liquid Crystal Display

The present invention also includes, as an embodiment thereof, a liquid crystal display that includes a light source and the optical member for a liquid crystal display of the present invention, in which the first polarizer is disposed on the light source side.

FIG. 3 shows a schematic cross-sectional view of a liquid crystal display that is an illustrative embodiment of the present invention. The liquid crystal display includes a light source 4 and a liquid crystal panel 5. Further, if needed, a driving circuit and others are incorporated therein. The liquid crystal panel 5 includes a first polarizer 3 on the side of the light source 4 of a liquid crystal cell 2. In addition, on the side opposite to the light source side of the liquid crystal cell 2, that is, on the viewing side, a second polarizer 1 is included. As the liquid crystal cell 2, any type of VA mode, IPS mode, TN mode, STN mode, and Bend alignment (π type) and the like is usable. The present invention is particularly preferably used in the VA mode or IPS mode, which generally requires high viewing angle characteristics at an oblique azimuth of 45°.

In the liquid crystal display of the present invention, by disposing the first polarizer 3 composed of the polarizer for a liquid crystal display of the present invention, which has high polarization performance, on the light source side of the liquid crystal cell 2, the polarizer can be attached to the liquid crystal cell when it is used in place of conventional absorption type polarizers. Additionally, since the polariser is provided with extremely high polarization performance of 99.5% or more, in terms of a contrast which is given by bright luminance/dark luminance of a liquid crystal display, a contrast of extremely high level, as requested practically for a liquid crystal television, can be attained.

The first polarizer composed of the polarizer for a liquid crystal display of the present invention has a high polarization performance of 99.5% or more, comparable to conventional absorption type polarizers, and a function as a luminance enhancement film capable of reflecting and reusing untransmitted polarized light. Therefore, a reflective polarizer called as a luminance enhancement film is not required to be used between the light source 4 and the first polarizer 3, and the functions of the luminance enhancement film and the polarizer used in adjacent to the liquid crystal cell can be unified. As a result, the number of members can be reduced.

Furthermore, the liquid crystal display of the present invention uses the polarizer for a liquid crystal display of the present invention as the first polarizer. Accordingly, the liquid crystal display of the present invention is characteristic of being able to eliminate a hue shift at an oblique azimuth angle of 45° specified in the present invention, in addition to elimination of a hue shift on swinging right and left that is conventionally investigated, namely, elimination of a observed hue shift by a s-polarized light, perpendicular to an incident plane including the stretched direction (X direction, referred to as in the present invention, or the extinction axis direction) of the film, incident at an oblique incident angle on an incident plane including the stretched direction (X direction, referred to as in the present invention, or the extinction axis direction) of the film. As a result, in a large-screen liquid crystal display, colors of projected images are reproduced as they are when viewed not only from the right and left directions but also from an oblique position at an oblique angle such as an azimuth of 45°.

In addition, as shown in FIG. 3, generally, the second polarizer 1 is disposed on the viewing side of the liquid crystal cell 2. The second polarizer 1 is not particularly limited, and known ones such as the absorption type polarizer and the like are usable. When the effect of outside light is extremely small, a reflective polarizer of the same kind as the first polarizer may be used as the second polarizer. Furthermore, on the viewing side of the liquid crystal cell 2, various kinds of optical layers such as, for example, optical compensation films may be disposed besides the second polarizer.

Formation of Liquid Crystal Display

The liquid crystal display of the present invention is obtained by combining the optical member (liquid crystal panel) for a liquid crystal display and a light source, and if needed, incorporating a driving circuit and others. In addition, besides these, various kinds of members needed to form the liquid crystal display may be combined. However, in a preferred liquid crystal display of the present invention, light radiated from a light source enters into the first polarizer.

In general, the light source of a liquid crystal display is broadly divided into a direct light system and a side light system. In the liquid crystal display of the present invention, any system is usable without limitation.

The liquid crystal display thus obtained is usable in various applications including OA devices such as monitors for personal computers, notebook personal computers, copy machines and the like, mobile devices such as cellular phones, smartphones, watches, digital cameras, personal data assistances (PDA), portable game machines and the like, electrical home appliances such as video cameras, television sets, microwave ovens and the like, in-car devices such as back monitors, monitors for car navigation systems, car audio systems and the like, display devices including shop information displays and the like, security gadgets such as surveillance monitors and the like, and nursing and medical devices such as nursing monitors, medical monitors and the like. In particular, when the liquid crystal display is used as the polarizer for a large-screen liquid crystal display, its effect is markedly exhibited.

EXAMPLES

The present invention is further described below with reference to examples, but it should be construed that the invention is in no way limited to those examples.

Note that, properties or performance in the examples were measured or evaluated by the following methods.

(1) Average Transmittance and Polarization Degree of P-Polarized Light and S-Polarized Light For the resulting reflective polarizing film, transmittance for P-polarized light, transmittance for S-polarized light, and polarization degree were measured using a polarization degree measurement instrument ("VAP7070S" manufactured by JASCO Corp.).

Polarization degree (P in %) is represented by the following equation (1), wherein, a measured value obtained when the transmission axis of a polarizing filter is aligned in a manner such that it coincides with the stretching direction (X direction) of the film is assigned to P-polarized light, and a measured value obtained when the transmission axis of a polarizing filter is aligned in a manner such that it is perpendicular to the stretching direction of the film is assigned to S-polarized light:

$$\text{Polarization degree } (P) = \{(Ts-Tp)/(Tp+Ts)\} \times 100 \quad (1)$$

in the equation (1), Tp represents an average transmittance for P-polarized light in a wavelength range of 400 nm to 800 nm, and Ts represents an average transmittance for S-polarized light in a wavelength range of 400 nm to 800 nm.

The measurement was performed while the incident angle of measurement light was selected to be 0°.

(2) Transmittance for the Light Polarized at an Azimuth of 45°, at an Incident Angle of 60°

Using the resulting reflective polarizing film and, as the measurement instrument, a polarization degree measurement instrument ("VAP7070S" manufactured by JASCO Corp.), transmittance in a wavelength range of 450 to 650 nm was measured when the film is tilted as corresponding to an incident angle of 60° on an incident plane including an azimuth angle of 45°. Based on the transmittance waveform in a wavelength range of 450 to 650 nm, the minimum transmittance and maximum transmittance were determined, and the difference of the values was assigned to the amplitude. The measurement was conducted by arranging the film such that the transmission axis of the polarizing filter was parallel to the transmission axis (Y direction) of the film.

(3) Average Reflectance

The relative specular reflectance between the barium sulfate reference plate and the reflective polarizing film was measured over the wavelength range of 400 nm to 800 nm by placing a polarizing filter on the light source side, by using a spectrophotometer ("MPC-3100" manufactured by Shimadzu Corp.). The measured value obtained by arranging the transmission axis of the polarizing filter in the stretched direction (X direction) of the film was assigned to P-polarized light, and the measured value obtained by arranging the transmission axis of the polarizing filter perpendicular to the stretched direction of the film was assigned to S-polarized light. For each polarized light component, an average value of reflectance in the wavelength range of 400 nm to 800 nm was defined as the average reflectance. Note that, the measurement was performed by setting the incident angle of the measured light to 0°.

(4) Melting Point (Tm) and Glass Transition Temperature (Tg) of the Polymer

Samples of 10 mg each were sampled from each layer. The melting point and the glass transition temperature of the polymer composing each layer were measured at a temperature rise rate of 20° C./min by using DSC ("DSC Q400" (trade name), manufactured by TA Instrument Corp.).

(5) Identification of the Polymer and Quantification of the Copolymer Components and Each Component For each layer of the film, polymer components, copolymer components, and each component were quantified by measurement.

(6) Thickness of Each Layer

The uniaxially stretched multi-layer laminate film was cut out into 2 mm in the longitudinal direction and 2 cm in the widthwise direction, fixed in an embedding capsule, and embedded by using an epoxy resin ("EPOMOUNT" manufactured by Refine Tech Corp.). The embedded sample was cut out perpendicularly to the surface in the widthwise direction using a microtome ("ULTRACUT UCT" manufactured by LEICA Corp.) to obtain a 5 nm-thick thin film.

Observation and photographing using a transmission electron microscope (Hitachi S-4300) at an acceleration voltage of 100 kV were performed. The thickness of each layer was measured based on the resulting pictures.

Among layers having a thickness of 1 μm or more, the one present inside the multi-layer structure is referred to as an intermediate layer and the one present in the outermost surface layer is referred to as an outermost layer. The thickness of each layer was measured. In addition, in the case where more than one intermediate layers were present, the thickness of the intermediate layers was determined from the average value thereof.

In addition, based on the thickness of each layer obtained, a ratio of the maximum thickness to the minimum thickness in the first layer and a ratio of the maximum thickness to the minimum thickness in the second layer were obtained.

In addition, an average thickness of the first layer and an average thickness of the second layer were obtained based on the thickness of each layer obtained. A ratio of the average thickness of the second layer to the average thickness of the first layer was calculated.

Note that, when the thicknesses of the first and second layers were evaluated, the intermediate layer and the outermost layer were excluded from the first and second layers.

(7) Total Thickness of Film

A film sample was nipped in a spindle gauge head ("K107C" manufactured by Anritsu Electric Co., Ltd.). Using a digital differential electronic micrometer ("K351" manufactured by Anritsu Electric Co., Ltd.), a thickness was measured at 10 different positions, and an average value thereof was calculated to obtain the film thickness.

(8) Wide-Angel X Ray Diffraction Peak Measurement

X ray diffraction peaks were measured using an X ray diffraction instrument (manufactured by Rigaku Corporation, ROTAFLEX RINT 2500HL) under the following conditions. Measurement was conducted using CuK-α as the X-ray source under the conditions of a divergence slit of ½°, a scattering slit of ½°, a reception slit of 0.15 mm, and a scan speed of 1.000°/min. at a 2θ angle of 10° to 60°. Diffraction peaks derived from crystal planes, an amorphous-derived halo, and the background were separated by the multiple peak separation method using a Pseudo Voight peak model. Of the diffraction peaks derived from crystal planes, whether a diffraction peak corresponding to the crystal (−110) plane was present or not was confirmed.

(9) Luminance Enhancing Effect

From a VA-type liquid crystal display panel (manufactured by Sharp Corporation, AQUOS LC-20E90, manufactured in 2011), the lower polarizer (polarizer on the light source side) and the optical compensation film were removed and replaced with a multi-layer laminate film sample. When a white color screen was displayed by the liquid crystal display, the front luminance of the liquid crystal display screen was measured using an FPD view angle measurement evaluation apparatus (ErgoScope88) manufactured by Opto Design Inc. A rate of increase in the luminance relative to that of Comparative Example 1 was calculated, and the luminance enhancing effect was evaluated under the following criteria.

AA: Luminance enhancement effect is 160% or more

A: Luminance enhancement effect is 150% or more and less than 160%

B: Luminance enhancement effect is 140% or more and less than 150%

C: Luminance enhancement effect is less than 140%

(10) Viewing Angle Characteristics (Hue in an Oblique Azimuth of 45°)

A display device for evaluation was formed as in the above (9). When a black color screen was displayed by the liquid crystal display, on the basis of the color observed from the front of the liquid crystal display screen, color change when observed at an angle of 60° from a direction perpendicular to the screen in an azimuth of 45° with the vertical direction of the screen assigned to 0° was evaluated under the following criteria.

AA: Color change is observed in a level comparable to that of Comparative Example 1

A: Slight color change is observed compared to Comparative Example 1, but the color can be perceived as black C: Color change is observed compared to Comparative Example 1, and colors other than black are observed

(11) Contrast

A liquid crystal display obtained as a display for a personal computer was used. When white color and black color screens were displayed by the personal computer, the front luminance of the picture screen of the liquid crystal display was measured using an FPD view angle measurement evaluation apparatus (ErgoScope88) manufactured by Opto Design Inc. Bright luminance was obtained from the white screen and dark luminance was obtained from the black screen. Contrast that is calculated from bright luminance/dark luminance was evaluated on the basis of the following criteria.

AA: contrast (bright luminance/dark luminance) is 2000 or more

A: contrast (bright luminance/dark luminance) is 1000 or more and less than 2000

C: contrast (bright luminance/dark luminance) is less than 1000

Comparative Example 1

Preparation of Polarizer

A polymer film ("9P75R" (trade name), manufactured by Kuraray Corp., (having a thickness of 75 μm, an average polymerization degree of 2400 and a saponification degree of 99.9 mol %)) containing a polyvinyl alcohol as a main ingredient was stretched and conveyed between rolls that have different circumferential speeds from each other while being dyed. At first, the polyvinyl alcohol film obtained was immersed in a 30° C. water bath for 1 minute and stretched by 1.2 times in a conveying direction while the film is swollen. Subsequently, the film was immersed for 1 minute at 30° C. in an aqueous solution containing 0.03 wt % of potassium iodide and 0.3 wt % of iodine, and the film was stretched by 3 times with respect to a totally unstretched film (original length) in the conveying direction while the film was dyed. Then, the film was stretched by 6 times with respect to the original length in the conveying direction while the film was immersed for 30 seconds at 60° C. in an aqueous solution containing 4 wt % of boric acid and 5 wt % of potassium iodide. Next, the resulting stretched film was dried at 70° C. for 2 minutes to obtain a polarizer. Note that, the polarizer had a thickness of 30 μm and a water content of 14.3 wt %.

(Preparation of Adhesive)

An aqueous solution containing 3.7 wt % of solid contents was prepared by dissolving 100 parts by weight of polyvinyl alcohol-based resin having an acetoacetyl group (an average polymerization degree of 1200, saponification degree of 98.5% and 5 mol % of acetoacetylation degree) and 50 parts by weight of methylol melamine in pure water at a temperature of 30° C. An adhesive aqueous solution was prepared by adding 18 weight part of an aqueous solution containing 10 wt % concentration of a solid of alumina colloid having an average particle diameter of 15 nm and having positive charges to 100 parts by weight of the aqueous solution. The adhesive aqueous solution had a viscosity of 9.6 mPa·s and a pH of 4 to 4.5. The amount of the alumina colloid was 74 parts by weight with respect to 100 parts by weight of the polyvinyl alcohol resin.

(Preparation of Absorption Type Polarizer)

On one face of an optical isotropic element ("FUJITAC ZRF80S" (trade name), manufactured by Fujifilm Corp.) having a thickness of 80 μm, a front face retardation of 0.1 nm and a thickness direction retardation of 1.0 nm, the aforementioned adhesive containing alumina colloid was coated in a manner such that the thickness after drying became 80 nm. The resultant element was laminated on the one face of the aforementioned polarizer by roll-to-roll processing in a manner such that both conveying directions became parallel to each other. Then, similarly, on the opposite face of the polarizer, the aforementioned adhesive containing alumina colloid was coated on one face of an optical isotropic element ("FUJITAC ZRF80S" (trade name) manufactured by Fujifilm Corp.), in a manner such that the thickness after drying became 80 nm. The resultant element was laminated by roll-to-roll processing in a manner such that both conveying directions became parallel to each other. Then, a polarizer was obtained after 55° C. drying for 6 minutes. The polarizer is referred to as "polarizer X".

Preparation of Liquid Crystal Panel

A liquid crystal panel was removed from a liquid crystal television set ("AQUOS LC-20E90" manufactured by Sharp Corp. in the year of 2011) which was equipped with a VA-mode liquid crystal cell and employed a direct backlight. A polarizer and an optical compensation film disposed on the top and bottom of the liquid crystal cell were removed. The glass faces (front and rear) of the liquid crystal cell were cleaned. Then, the aforementioned polarizer X was disposed on the light source side of the liquid crystal cell through an acrylic adhesive, with the absorption axis in the same direction as the absorption axis of the polarizer that had been disposed on the light source side of the original liquid crystal panel.

Next, the viewing side of the aforementioned polarizer X was disposed on the liquid crystal cell through an acrylic adhesive, with the absorption axis in the same direction as the absorption axis of the polarizer that had been disposed on the viewing side of the original liquid crystal panel. In this way, a liquid crystal panel was obtained in which the polarizer X was disposed on the one main face of the liquid crystal cell and the polarizer X was disposed on the other main face thereof.

(Fabrication of Liquid Crystal Display)

The liquid crystal panel described above was incorporated in the original liquid crystal television. The light source of the liquid crystal television was lighted, and a white color screen and a black color screen were displayed by using a personal computer. Then, luminance of the liquid crystal display was evaluated.

Example 1

In the presence of titanium tetrabutoxide, 2,6-naphthalene dimethyl dicarboxylate, 6,6'-(ethylenedioxy)di-2-naphthonic acid and ethylene glycol were subjected to esterification and ester-exchange. After subsequent polycondensation, an aromatic polyester (in Tables, referred to as ENA30PEN) used as the polyester for the first layer was prepared. The aromatic polyester had an intrinsic viscosity of 0.63 dL/g and contained 2,6-naphthalene dicarboxylic acid component at 70 mol % of the acid component, 6,6'-(ethylenedioxy)di-2-naphthoic acid component (in Tables, referred to as ENA) at 30 mol % of the acid component, and ethylene glycol as the glycol component. As the polyester for the second layer, a copolymer polyethylene terephthalate (NDC30SPG20PET) was prepared, which had an intrinsic viscosity of 0.70 dL/g and contained 30 mol % of 2,6-naphthalene dicarboxylic acid and 20 mol % of spiroglycol.

The prepared polyester for the first layer and the prepared polyester for the second layer were dried at 170° C. for 5 hours and at 85° C. for 8 hours respectively, and subsequently, they were each supplied to a first extruder and a second extruder and heated to 300° C. to bring them into a fused state. The polyester for the first layer was branched into 138 layers. The polyester for the second layer was branched into 137 layers. Then, a fused laminate body having a total of 275 layers in which the first layer and the second layer were alternately laminated was produced by using a multi-layer feed block apparatus, wherein the first layer and the second layer were alternately laminated, and the maximum layer thickness and the minimum layer thickness in each of the first layer and the second layer were forced to change continuously until the ratio of maximum/minimum became 3.1 times and 3.0 times. On both sides of the fused laminated body, while keeping the fused state, the same polyester as the polyester for the second layer was introduced from a third extruder into a three layer feed block apparatus, so that buffer layers were laminated in the lamination direction of the fused laminate on both sides of the fused laminate body of a total of 275 layers. The amount supplied to the third extruder was adjusted in a manner such that the sum of the buffer layers on both sides was 30% of the resulting whole body. The laminate was further branched into three using a layer doubling block, which were then laminated in a ratio of 1:1:1. The resulting laminate of a total of 829 layers, including two intermediate layers inside thereof and two outermost layers in the outermost surface layer thereof, was introduced into a die while keeping the lamination state and cast on a casting drum so as to adjust the average thickness ratio between the first layer and the second layer to 1.0:2.6. In this way, a uniaxially unstretched multi-layer laminate film having a total of 829 layers was prepared.

The unstretched multi-layer film was stretched by 5.0 times in the widthwise direction at 115° C., and then the film was subjected to heat fixing treatment at 120° C. for 3 seconds while the film was stretched by 15% in the same direction at 115° C. The resulting uniaxially stretched multi-layer laminate film had a thickness of 105 μm.

(Formation of Liquid Crystal Panel)

Except that, in place of polarizer X as a first polarizer on the side of a light source in Comparative Example 1 above, the reflective polarizing film obtained above was used, a liquid crystal panel was obtained similarly to Comparative Example 1, in which the reflective polarizing film obtained above (first polarizer) was disposed on the main face of the liquid crystal cell on the side of a light source and the polarizer X (second polarizer) was disposed on the main face on the viewing side.

(Fabrication of Liquid Crystal Display)

The liquid crystal panel described above was incorporated in the original liquid crystal display. The light source of the liquid crystal display was lighted and luminance of a white screen and a black screen of a personal computer was evaluated.

Resin compositions and characteristics of each layer of the resulting uniaxially stretched multi-layer laminate film are shown in Table 1. The properties of the uniaxially stretched multi-layer laminate film and the liquid crystal display are shown in Table 2.

Examples 2 to 5

As shown in Table 1, except that resin compositions of each layer, layer thickness and stretching conditions were changed, a uniaxially stretched multi-layer film was obtained similarly to Example 1. The resin compositions and characteristics of each layer of the resulting uniaxially stretched multi-layer laminate film are shown in Table 1. The properties of the uniaxially stretched multi-layer laminate film and the liquid crystal display are shown in Table 2.

In Example 2, ENA40PEN (aromatic polyester containing 2,6-naphthalene dicarboxylic acid component at 60 mol % of the acid component, 6,6'-(ethylenedioxy)di-2-naphthonic acid component at 40 mol % of the acid component, and ethylene glycol as the glycol component) as the polyester for the first layer and IA20PET (copolymer polyethylene terephthalate containing 20 mol % of isophthalic acid) as the polyester for the second layer were used. A film stretched at a stretching temperature of 120° C. and a stretching ratio of 5.1 was obtained.

In Example 3, the same materials as in Example 1 were used as the first layer polyester and the second layer polyester. The film was stretched at a stretching temperature of 130° C. and a stretching ratio of 5.8. While further stretched at 130° C. by 15% in the same direction, the film was subjected to heat fixing treatment at 130° C. for 3 seconds, thereby providing a film.

In Example 4, ENA35PEN (aromatic polyester containing 2,6-naphthalene dicarboxylic acid component at 65 mol % of the acid component, 6,6'-(ethylenedioxy)di-2-naphthonic acid component at 35 mol % of the acid component, and ethylene glycol as the glycol component) as the first layer polyester and "PETG" (trade name) manufactured by Eastman Chemical Company (CHDM30PET, copolymer PET containing 30 mol % of cyclohexane dimethanol) as the polyester for the second layer were used. The film was stretched at a stretching temperature of 130° C. and a stretching ratio of 5.8. While further stretched at 130° C. by 10% in the same direction, the film was subjected to heat fixing treatment at 130° C. for 3 seconds, thereby providing a film.

In Example 5, BB30PEN (aromatic polyester containing 2,6-naphthalene dicarboxylic acid component at 70 mol % of the acid component, diphenyl dicarboxylic acid component at 30 mol % of the acid component, and ethylene glycol as the glycol component) as the first layer polyester and "PCTA AN004" (trade name) manufactured by Eastman Chemical Company (polycyclohexanedimethylene terephthalate-isophthalate copolymer) as the polyester for the second layer were used. The film was stretched at a stretching temperature of 125° C. and a stretching ratio of 4.6. While further stretched at 125° C. by 10% in the same direction, the film was subjected to heat fixing treatment at 125° C. for 3 seconds, thereby providing a film.

Also in Comparative Example 1 above, except that, in place of polarizer X as a first polarizer on the side of a light source, the reflective polarizing film obtained above was used, a liquid crystal panel was obtained substantially similarly to Comparative Example 1, in which the reflective polarizing film obtained above (first polarizer) was disposed on the main face of the liquid crystal cell on the light source side and the polarizer X (second polarizer) was disposed on the main face on the viewing side.

The liquid crystal panel described above was incorporated in the original liquid crystal display. The light source of the liquid crystal display was lighted and luminance of a white screen and a black screen of a personal computer was evaluated.

Comparative Example 2

ENA35PEN (aromatic polyester containing 2,6-naphthalene dicarboxylic acid component at 65 mol % of the acid component, 6,6'-(ethylenedioxy)di-2-naphthonic acid component at 35 mol % of the acid component, and ethylene glycol as the glycol component) as the polyester for the first layer and IA20PET (copolymer polyethylene terephthalate containing 20 mol % of isophthalic acid) as the polyester for the second layer were used. The film was also stretched at a stretching temperature of 135° C. and a stretching ratio of 6.0. While further stretched at 135° C. by 15% in the same direction, the film was subjected to heat fixing treatment at 120° C. for 3 seconds, thereby providing a film.

The film of Comparative Example 2, which was also copolymer polyester as in Examples, had increase in the plane orientation component of the first layer due to the high stretching ratio and stretching temperature. Accordingly, since the difference in the interlayer refractive indexes in Z direction was not sufficient, variation in the transmittance waveform at the oblique azimuth of 45° was large. Therefore, the hue shift was not sufficiently eliminated when viewing angle characteristics were evaluated in the liquid crystal display. The number of lamination was also insufficient, resulting in a low polarization degree.

Comparative Example 3

ENA21PEN (aromatic polyester containing 2,6-naphthalene dicarboxylic acid component at 79 mol % of the acid component, 6,6'-(ethylenedioxy)di-2-naphthonic acid component at 21 mol % of the acid component, and ethylene glycol as the glycol component) as the polyester for the first layer and IA20PET (copolymer polyethylene terephthalate containing 20 mol % of isophthalic acid) as the polyester for the second layer were used. The film was also stretched at a stretching temperature of 120° C. and a stretching ratio of 5.2. While further stretched at 120° C. by 15% in the same direction, the film was subjected to heat fixing treatment at 120° C. for 3 seconds, thereby providing a film. The film of Comparative Example 3 contained the component represented by formula (A) of the aromatic polyester (I) at a lower proportion than in Examples, and thus variation in the transmittance waveform at the oblique azimuth of 45° was large. Therefore, the hue shift was not sufficiently eliminated when viewing angle characteristics were evaluated in the liquid crystal display.

TABLE 1

| | First layer | | | | Second layer | | | Thickness of optical interference layers | |
|---|---|---|---|---|---|---|---|---|---|
| | Resin | | | | Resin | | | | |
| | Kind of resin | Melting Point (° C.) | Tg (° C.) | Number of layers | Kind of resin | Tg (° C.) | Number of layers | Number of optical interference layers | of optical interference layers per unit [μm] | Number of doubling |
| Example 1 | ENA30PEN | 250 | 110 | 138 | NDC30 SPG20PET | 95 | 137 | 275 | 27 | 3 |
| Example 2 | ENA40PEN | 254 | 109 | 138 | IA20PET | 75 | 137 | 275 | 27 | 3 |
| Example 3 | ENA30PEN | 250 | 110 | 138 | NDC30 SPG20PET | 95 | 137 | 275 | 27 | 3 |
| Example 4 | ENA35PEN | 235 | 113 | 138 | CHD M30PET | 78 | 137 | 275 | 27 | 3 |
| Example 5 | BB30PEN | 270 | 110 | 138 | PCTA | 90 | 137 | 275 | 27 | 3 |
| Comparative example 2 | ENA35PEN | 235 | 113 | 138 | IA20PET | 75 | 137 | 275 | 27 | 1 |
| Comparative example 3 | ENA21PEN | 230 | 110 | 138 | IA20PET | 75 | 137 | 275 | 27 | 3 |

| | Outermost layer/ Intermediate layer/ Intermediate layer/ Outermost layer [μm] | Total thickness [μm] | Layer thickness ratio (Second layer/first Layer) | First layer | | | Second layer | | |
|---|---|---|---|---|---|---|---|---|---|
| | | | | Min. thickness [nm] | Max. thickness [nm] | Max/Min | Min. thickness [nm] | Max. thickness [nm] | Max/Min |
| Example 1 | 4/8/8/4 | 105 | 2.6 | 40 | 124 | 3.1 | 46 | 138 | 3.0 |
| Example 2 | 4/8/8/4 | 105 | 2.6 | 40 | 125 | 3.1 | 48 | 140 | 2.9 |
| Example 3 | 4/8/8/4 | 105 | 2.6 | 40 | 124 | 3.1 | 46 | 138 | 3.0 |
| Example 4 | 6/12/12/6 | 117 | 2.6 | 41 | 126 | 3.1 | 45 | 139 | 3.1 |
| Example 5 | 15/30/30/15 | 171 | 2.6 | 42 | 126 | 3.0 | 46 | 140 | 3.0 |
| Comparative example 2 | 4/—/—/4 | 35 | 2.6 | 40 | 124 | 3.1 | 46 | 138 | 3.0 |
| Comparative example 3 | 4/8/8/4 | 105 | 2.6 | 40 | 124 | 3.1 | 46 | 138 | 3.0 |

| | Stretching in film forming direction | | Stretching in widthwise direction of film | | | Heat fixing |
|---|---|---|---|---|---|---|
| | Magnification (times) | Temperature (° C.) | Magnification (times) | Temperature (° C.) | Toe-out % | Temperature (° C.) |
| Example 1 | 1.0 | — | 5.0 | 115 | 15% | 120 |
| Example 2 | 1.0 | — | 5.1 | 120 | 15% | 120 |
| Example 3 | 1.0 | — | 5.8 | 130 | 15% | 130 |
| Example 4 | 1.0 | — | 5.8 | 130 | 10% | 130 |
| Example 5 | 1.0 | — | 4.6 | 125 | 10% | 125 |
| Comparative example 2 | 1.0 | — | 6.0 | 135 | 15% | 120 |
| Comparative example 3 | 1.0 | — | 5.2 | 120 | 15% | 120 |

TABLE 2

| | Optical characteristics at 0° incidence | | | Optical characteristics at azimuth of 45° and incident angle of 60° | | | | | | |
|---|---|---|---|---|---|---|---|---|---|---|
| | Average transmittance | | | Transmittance (λ 450 nm to 650 nm) | | | Presence or absence of diffraction peak of (−110) crystal plane | Luminance enhancement effect | Viewing angle characteristics (azimuth of 45° and incident angle of 60°) | Contrast |
| | Transmittance for P-polarized light [%] | Transmittance for S-polarized light [%] | Polarization degree | Minimum transmittance [%] | Maximum transmittance [%] | Amplitude (Maximum − Minimum transmittance) [%] | | | | |
| Example 1 | 0.15 | 85.0 | 99.65 | 5.5 | 6.0 | 0.5 | No | AA | AA | AA |
| Example 2 | 0.20 | 85.0 | 99.53 | 5.0 | 6.0 | 1.0 | No | AA | AA | A |
| Example 3 | 0.15 | 85.0 | 99.65 | 5.5 | 6.0 | 0.5 | Yes | AA | A | AA |
| Example 4 | 0.02 | 86.0 | 99.97 | 5.0 | 6.7 | 1.7 | Yes | AA | A | AA |
| Example 5 | 0.15 | 84.0 | 99.64 | 6.0 | 7.8 | 1.8 | Yes | AA | A | AA |

TABLE 2-continued

|  | Optical characteristics at 0° incidence | | | Optical characteristics at azimuth of 45° and incident angle of 60° | | | | | | |
|---|---|---|---|---|---|---|---|---|---|---|
|  | Average transmittance | | | Transmittance (λ 450 nm to 650 nm) | | | Presence or | | | |
|  | Transmittance for P-polarized light [%] | Transmittance for S-polarized light [%] | Polarization degree | Minimum transmittance [%] | Maximum transmittance [%] | Amplitude (Maximum − Minimum transmittance) [%] | absence of diffraction peak of (−110) crystal plane | Luminance enhancement effect | Viewing angle characteristics (azimuth of 45° and incident angle of 60°) | Contrast |
| Comparative example 2 | 10.00 | 89.0 | 79.80 | 13.0 | 16.0 | 3.0 | Yes | C | C | C |
| Comparative example 3 | 0.20 | 89.0 | 99.55 | 5.0 | 9.0 | 4.0 | Yes | AA | C | AA |

INDUSTRIAL APPLICABILITY

The uniaxially stretched multi-layer laminate film of the present invention, while being a reflective polarizer composed of a polymer film having a multi-layer structure, has a high polarization performance and additionally eliminates a hue shift in an oblique azimuth of 45°, and thus can be suitably used as a polarizer for a liquid crystal display that is required to provide a display with higher image quality. Accordingly, an optical member for a liquid crystal display and a liquid crystal display that employs the polarizer as a polarizer disposed adjacent to a liquid crystal cell can be provided.

The invention claimed is:

1. A reflective polarizing film for a liquid crystal display polarizer comprising a uniaxially stretched multi-layer laminate film in which a first layer and a second layer are alternately laminated,
wherein the reflective polarizing film has a polarization degree (P) represented by the following equation (1) of 99.9% or more:

Polarization degree $(P) = \{(Ts - Tp)/(Tp + Ts)\} \times 100$    (1)

wherein, in the equation (1), Tp represents an average transmission for P-polarized light in a wavelength range of 400 nm to 800 nm and Ts represents an average transmission for S-polarized light in a wavelength range of 400 nm to 800 nm, and
wherein the amplitude of a transmittance waveform in a wavelength range of 450 to 650 nm is 2.0% or less, the amplitude being measured among polarized light components parallel to the transmission axis with respect to the incident polarized light at an incident angle of 60° on an incident plane including an azimuth angle of 45°, when a uniaxially stretched direction (X direction) is assigned to the extinction axis of the reflective polarizing film and a film in-plane direction (Y direction) perpendicular to the uniaxially stretched direction is assigned to the transmission axis of the reflective polarizing film, and X direction is set at an azimuth angle of 0° and Y direction is set at an azimuth angle of 90°,
wherein the first layer is a layer containing a polyester, the first layer containing a naphthalene dicarboxylic acid component as a dicarboxylic acid component that composes the polyester, in an amount of 70 mol % or less based on a total amount of dicarboxylic acid that composes the polyester,
wherein the ratio between the maximum layer thickness and the minimum layer thickness (the maximum layer thickness/the minimum layer thickness) in the first layer is 3.0 or more,
wherein the ratio between the maximum layer thickness and the minimum layer thickness (the maximum layer thickness/the minimum layer thickness) in the second layer is 2.9 or more.

2. The reflective polarizing film for a liquid crystal display polarizer according to claim 1, wherein the first layer is a layer containing a polyester, the first layer 1) containing a naphthalene dicarboxylic acid component as a dicarboxylic acid component that composes the polyester, in an amount of 50 mol % or more and 70 mol % or less based on a total amount of dicarboxylic acid that composes the polyester, 2) containing a diol component having an alkylene group having 2 to 10 carbon atoms as a diol component, in an amount of 90 mol % or more and 100 mol % or less based on a total amount of diol that composes the polyester, and 3) having no diffraction peak of a (−110) crystal plane derived from the crystalline structure of an alkylene naphthalate in wide-angle X-ray diffraction measurement.

3. The reflective polarizing film for a liquid crystal display polarizer according to claim 1, wherein the first layer contains a component represented by the following formula (A) as a dicarboxylic acid component, in an amount of 25 mol % or more and 50 mol % or less based on a total amount of dicarboxylic acid that composes the polyester:

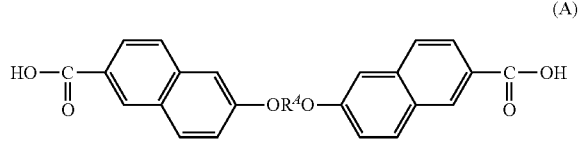

(A)

wherein, in the formula (A), $R^4$ represents an alkylene group having 2 to 10 carbon atoms.

4. The reflective polarizing film for a liquid crystal display polarizer according to claim 1, wherein the first layer contains a component represented by the following formula (B) as a dicarboxylic acid component, in an amount of 25 mol % or more and 50 mol % or less based on a total amount of dicarboxylic acid that composes the polyester:

(B)

wherein, in the formula (B), $R^B$ represents a biphenyl group.

5. The reflective polarizing film for a liquid crystal display polarizer according to claim 1, wherein the polymer that forms the second layer is a copolymer polyethylene terephthalate containing at least one kind selected from the group consisting of isophthalic acid, 2,6-naphthalene dicarboxylic acid, and alicyclic diol as the copolymer component.

6. The reflective polarizing film for a liquid crystal display polarizer according to claim 5, wherein the alicyclic diol is at least one kind selected from the group consisting of spiroglycol, tricyclodecane dimethanol, and cyclohexane dimethanol.

7. The reflective polarizing film for a liquid crystal display polarizer according to claim 1, wherein the number of lamination of the uniaxially stretched multi-layer laminate film is 251 layers or more.

8. The reflective polarizing film for a liquid crystal display polarizer according to claim 1, wherein the uniaxially stretched multi-layer laminate film contains an intermediate layer.

9. The reflective polarizing film for a liquid crystal display polarizer according to claim 1, wherein the film is used in adjacent to a liquid crystal cell.

10. A polarizer for a liquid crystal display comprising the reflective polarizing film for a liquid crystal display polarizer according to claim 1.

11. An optical member for a liquid crystal display comprising laminating a first polarizer composed of the polarizer for a liquid crystal display according to claim 10, a liquid crystal cell, and a second polarizer in this order.

12. The optical member for a liquid crystal display according to claim 11, wherein a configuration in which the first polarizer is laminated with an absorption type polarizer is excluded.

13. The optical member for a liquid crystal display according to claim 11, wherein the second polarizer is an absorption type polarizer.

14. An optical member for a liquid crystal display comprising laminating a first polarizer, a liquid crystal cell, and a second polarizer, wherein the first polarizer and the second polarizer are composed of the polarizer for a liquid crystal display according to claim 10.

15. A liquid crystal display comprising a light source and the optical member for a liquid crystal display according to claim 11, wherein the first polarizer is disposed on the light source side.

16. The liquid crystal display according to claim 15, having no additional reflective polarizer between the light source and the first polarizer.

17. The reflective polarizing film for a liquid crystal display polarizer according to claim 2, wherein the first layer contains a component represented by the following formula (A) as a dicarboxylic acid component, in an amount of 25 mol % or more and 50 mol % or less based on a total amount of dicarboxylic acid that composes the polyester:

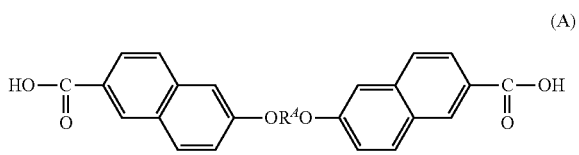

(A)

wherein, in the formula (A), $R^A$ represents an alkylene group having 2 to 10 carbon atoms.

18. The reflective polarizing film for a liquid crystal display polarizer according to claim 2, wherein the first layer contains a component represented by the following formula (B) as a dicarboxylic acid component, in an amount of 25 mol % or more and 50 mol % or less based on a total amount of dicarboxylic acid that composes the polyester:

(B)

wherein, in the formula (B), $R^B$ represents a biphenyl group.

19. The optical member for a liquid crystal display according to claim 12, wherein the second polarizer is an absorption type polarizer.

* * * * *